US009458046B1

(12) United States Patent
Kamiya et al.

(10) Patent No.: US 9,458,046 B1
(45) Date of Patent: Oct. 4, 2016

(54) WHITE GLASS CONTAINER AND METHOD OF PRODUCING WHITE GLASS CONTAINER

(71) Applicant: KOA GLASS CO., LTD., Tokyo (JP)

(72) Inventors: Yoshiaki Kamiya, Tokyo (JP); Michiko Takahashi, Tokyo (JP)

(73) Assignee: KOA GLASS CO., LTD., Tokyo (JP)

( * ) Notice: Subject to any disclaimer, the term of this patent is extended or adjusted under 35 U.S.C. 154(b) by 0 days.

(21) Appl. No.: 14/387,316

(22) PCT Filed: Oct. 17, 2013

(86) PCT No.: PCT/JP2013/078225
§ 371 (c)(1),
(2) Date: Sep. 23, 2014

(87) PCT Pub. No.: WO2014/188614
PCT Pub. Date: Nov. 27, 2014

(30) Foreign Application Priority Data

May 20, 2013 (JP) .................... 2013-106461

(51) Int. Cl.
*C03B 32/02* (2006.01)
*C03B 5/193* (2006.01)
*C03B 9/38* (2006.01)
*B65D 1/40* (2006.01)

(52) U.S. Cl.
CPC ............. *C03B 32/02* (2013.01); *B65D 1/40* (2013.01); *C03B 5/193* (2013.01); *C03B 9/385* (2013.01); *C03B 9/3866* (2013.01); *C03B 9/3875* (2013.01)

(58) Field of Classification Search
CPC ....... C03B 32/02; C03B 5/193; C03B 9/385; C03B 9/3866; C03B 9/3875; B65D 1/40
See application file for complete search history.

(56) References Cited

U.S. PATENT DOCUMENTS

| 3,524,748 | A | 8/1970 | Beall |
| 4,336,303 | A | 6/1982 | Rittler |
| 4,337,295 | A | 6/1982 | Rittler |
| 2005/0049134 | A1 | 3/2005 | Komori |
| 2005/0155518 | A1 | 7/2005 | Krumbholz |

FOREIGN PATENT DOCUMENTS

| EP | 0213733 A1 | 3/1987 |
| JP | 50-150715 A | 12/1975 |
| JP | 62-52140 A | 3/1987 |
| JP | 8-277142 A | 10/1996 |
| JP | 2001-220176 A | 8/2001 |
| JP | 1552650 A | 12/2004 |
| JP | 2005-67953 A | 3/2005 |
| JP | 2006-327882 A | 12/2006 |
| WO | 2009/133761 A1 | 11/2009 |

OTHER PUBLICATIONS

Extended European Search Report, mailed Feb. 16, 2016, for European Application No. 13879247.8.

*Primary Examiner* — Michael C Miggins
(74) *Attorney, Agent, or Firm* — Fitch, Even, Tabin & Flannery LLP

(57) ABSTRACT

The present invention provides a white glass container which does not contain a fluorine compound in a significant amount, which has a multi-layer structure derived from a phase separation phenomenon of a glass composition in part or the whole of the white glass container without depending on melting conditions or molding conditions of the glass composition, and which is excellent in mechanical strength or whiteness, and a method of efficiently manufacturing the white glass container.

9 Claims, 8 Drawing Sheets

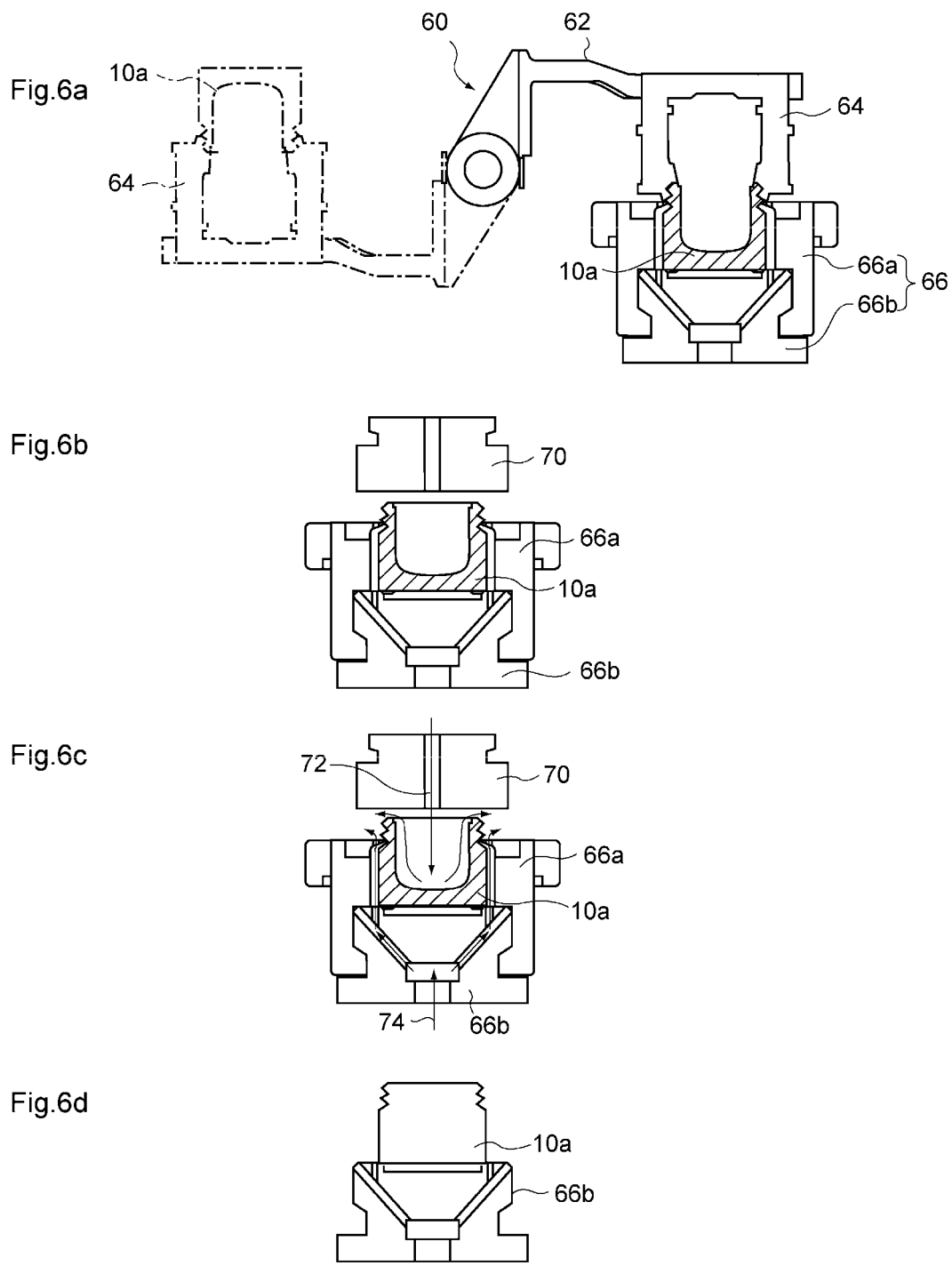

WHITE GLASS CONTAINER AND METHOD OF PRODUCING WHITE GLASS CONTAINER

TECHNICAL FIELD

The present invention relates to a white glass container and a method of manufacturing the same, and particularly, to a white glass container having a multi-layer structure, which is derived from a phase separation phenomenon of a glass composition not containing a significant amount of fluorine, in part or the whole of the white glass container and a method of manufacturing the same.

BACKGROUND ART

Whitened glass in which a light transmittance is reduced by interposing particles having refraction indexes different from each other, and the like in transparent glass to cause light scattering, or by uniformly dispersing opaque fine particles in a predetermined amount from the first, is generally called opalescent glass, Oparine glass, or white glass. The whitened glass has been used as a container, tableware, a building material, and the like in consideration of satisfactory beauty and storage stability.

Here, a white glass composition in the related art typically contains a predetermined amount of fluorine, and a crystal phase of NaF as an opalescent component uniformly dispersed in a glass phase of $SiO_2$ as a main component, thereby obtaining an opalescent color (for example, refer to Patent Document 1).

More specifically, the white glass composition in the related art is a white glass composition that contains 70% by weight to 73% by weight of $SiO_2$ and 4% by weight to 6% by weight of fluorine, and a white glass container is formed using the white glass composition.

On the other hand, a method of manufacturing crystallized glass formed from a glass composition that does not contain fluorine is suggested (for example, refer to Patent Document 2).

More specifically, the method is a method of manufacturing opaque (white) crystallized glass which contains phosphorous. The method includes forming glass by using a glass composition containing a predetermined glass composition in an amount of 90% by weight or more on the basis of the total amount, the predetermined glass composition containing, in terms of % by weight, 45% to 65% of $SiO_2$, 3% to 15% of $Al_2O_3$, 10% to 25% of $Na_2O$, 12% to 25% of CaO, and 3% to 8% of $P_2O_5$. Then, the glass is gradually cooled, and is subjected to a post-heat treatment at approximately 900° C. to perform crystallization.

Furthermore, the applicant of the invention suggests an opalescent glass composition which does not contain a significant amount of fluorine, which can be safely and easily produced, which has high whiteness, and which can be melted at a low temperature (for example, refer to Patent Document 3).

More specifically, the opalescent glass composition contains 35% by weight to 65% by weight of $SiO_2$, 3.5% by weight to 10% by weight of $P_2O_5$, 5.5% by weight to 15% by weight of $Al_2O_3$, 3% by weight to 15% by weight of CaO, and the like so as to obtain opalescent glass by only melting a predetermined glass raw material at approximately 1400° C. and performing gradual cooling.

CITATION LIST

Patent Document

Patent Document 1: JP 62-52140 (claims and the like)
Patent Document 2: JP 50-150715 (claims and the like)
Patent Document 3: JP 8-277142 (claims and the like)

DISCLOSURE OF THE INVENTION

Problem to be Solved by the Invention

However, when manufacturing the white glass composition disclosed in Patent Document 1, as a fluorine raw material, fluorite ($CaF_2$), sodium silicofluoride ($Na_2SiF_6$), cryolite ($Na_3AlF_6$), and the like are used, and thus a fluorine gas scatters in a significant amount (approximately 10% to 50%) during glass melting. Therefore, air pollution is caused, and the fluorine gas is harmful to agricultural products, and the like. As a result, there is a problem in that safety is deficient.

In addition, according to the method of manufacturing the crystallized glass containing phosphorous which is disclosed in Patent Document 2, there is a manufacturing problem in that if a post-heat treatment at a high temperature of approximately 900° C. is not performed after molding glass and gradually cooling the glass, it is difficult to obtain the opaque (white) crystallized glass.

Furthermore, the glass composition that is disclosed has a problem in that the crystallized glass that can be obtained is not sufficient in whiteness and tends to be transparent. The reason of this problem is considered to be because although the glass composition does not contain fluorine, the blending amount of $Na_2O$, CaO, and the like is too much, but $B_2O_3$, and the like are not used at all.

Furthermore, according to the opalescent glass composition which is disclosed in Patent Document 3, it is possible to obtain opalescent glass without performing the post-heat treatment at a temperature that is equal to or higher than a glass transition temperature, but a phenomenon in which calcium phosphate and the like precipitates in accordance with melting conditions of a glass raw material, and thus whiteness or mechanical strength decreases or coloring occurs due to reduction.

Furthermore, in the white glass that can be obtained from the opalescent glass composition, the mechanical strength thereof further significantly decreases due to gradual cooling conditions after molding in some cases.

Therefore, the present inventors of the invention have made a thorough investigation, and as a result, they have found that a white glass container having a multi-layer structure including a phase separation region in part or the whole of the white glass container from a white glass composition not containing a significant amount of fluorine compound by considering blending of glass raw materials, stirring conditions, a molding method using a mold, and the like.

That is, an object of the invention is to provide a white glass container that is excellent in mechanical strength or whiteness without depending on melting conditions of a glass composition, gradual cooling conditions after molding, and the like, and a method of efficiently manufacturing the white glass container.

Means for Solving Problem

According to an aspect of the invention, there is provided a white glass container which is derived from a phase separation phenomenon of a glass composition having the following glass blending composition on the basis of the total amount and which has a multi-layer structure including a white transparent layer having relatively low whiteness and a white opaque layer having relatively high whiteness in part or the whole of the white glass container, thereby solving the above-described problems.

$SiO_2$: 45% by weight to 58% by weight
$P_2O_5$: 2% by weight to 8% by weight
$Al_2O_3$: 5% by weight to 9% by weight
$B_2O_3$: 5% by weight to 13% by weight
$Na_2O$: 5% by weight to 12% by weight
$K_2O$: 1% by weight to 6% by weight
ZnO: 3% by weight to 10% by weight
CaO: 3% by weight to 10% by weight That is, the blending composition of the glass raw materials is limited as described above so as not to contain a significant amount of fluorine compound. According to this, it is possible to efficiently obtain a white glass container having the multi-layer structure, which is derived from the phase separation phenomenon of the glass composition, in part or the whole of the white glass container by performing molding by using a predetermined mold and the like without depending on melting conditions or molding conditions of the glass composition.

In addition, the whiteness of the white glass container (body portion and the like) can be determined on the basis of a degree of whiteness (L) which is measured according to JIS Z 8730. For example, when the degree of whiteness (L) is 70 or more, it can be said that the whiteness is relatively high. In contrast, when the degree of whiteness (L) is below 70, it can be said that the whiteness is relatively low.

In addition, in a case where the total amount of the glass raw materials exceeds 100% by weight, the blending amount of each glass component is converted to obtain each defined blending ratio with the total amount set to 100% by weight. In addition, in a case where the total amount of the glass raw materials is below 100% by weight, other glass components and the like are supplemented (the same shall apply hereinafter).

When constructing the white glass container of the invention, it is preferable that the glass composition further contains at least one metal oxide selected from a group consisting of BaO, $Li_2O$, and $SO_3$, and a blending amount of at least one of the metal oxide among BaO, $Li_2O$, and $SO_3$ is set to a value within the range of 0.1% by weight to 5% by weight on the basis of the total amount.

When containing the glass component, it is possible to increase meltability of the glass composition, or moldability, whiteness, and the like of the white glass container that can be obtained.

In addition, when constituting the white glass container of the invention, it is preferable that the glass composition contains $CeO_2$ as an oxidizing agent, and a blending amount of $CeO_2$ is set to a value within the range of 0.1% by weight to 2% by weight on the basis of the total amount.

When containing the oxidizing agent, even in a case where water for glass component dispersion is added from the outside and thus it enters a reducing atmosphere, $CeO_2$ as the oxidizing agent returns the reducing atmosphere to an oxidizing atmosphere, and thus it is possible to effectively prevent coloring of white glass due to iron ions and the like.

In addition, when constructing the white glass container, it is preferable that the glass composition further contains $Er_2O_3$, and a blending amount of $Er_2O_3$ is set to a value within the range of 0.01% by weight to 0.5% by weight on the basis of the total amount.

When containing $Er_2O_3$ that functions as a decoloring agent, it is possible to effectively prevent coloring of the white glass container by using a complementary color relationship of $Er_2O_3$.

In addition, when constituting the white glass container of the invention, it is preferable that the thickness of the white transparent layer is set to a value within the range of 0.1 mm to 10 mm, and the thickness of the white opaque layer is set to a value within the range of 3 mm to 25 mm.

When providing the white transparent layer and the white opaque layer in the above-described thickness, respectively, it is possible to raise mechanical strength of the white glass container and it is possible to obtain satisfactory glossiness.

In addition, according to another aspect of the invention, there is provided a method of manufacturing a white glass container having a three-layer structure, which is derived from a phase separation phenomenon of a glass composition and which includes a white transparent layer having relatively low whiteness, a white opaque layer having relatively high whiteness, and a white transparent layer having relatively low whiteness in this order from an inner side to an outer side, in part or the whole of the white glass container. The method includes the following first and second processes.

First process: Process of preparing a glass composition having the following glass blending composition on the basis of the total amount, and melting the glass composition $SiO_2$: 45% by weight to 58% by weight
$P_2O_5$: 2% by weight to 8% by weight
$Al_2O_3$: 5% by weight to 9% by weight
$B_2O_3$: 5% by weight to 13% by weight
$Na_2O$: 5% by weight to 12% by weight
$K_2O$: 1% by weight to 6% by weight
ZnO: 3% by weight to 10% by weight
CaO: 3% by weight to 10% by weight Second process: Process of molding and gradually cooling the glass composition, which is melted, by using a mold and a plunger according to a one-press method to obtain the white glass container having a multi-layer structure derived from the phase separation phenomenon of the glass composition in part or the whole of the white glass container That is, when manufacturing the white glass container in this manner, a significant amount of fluorine compound is not contained. According to this, it is possible to efficiently obtain a white glass container having a multi-layer structure (three-layer structure), which includes a phase separation region, in part or the whole of the white glass container by using a predetermined mold and the like without depending on melting conditions or molding conditions of the glass composition.

According to still another aspect of the invention, there is provided a method of manufacturing a white glass container having a two-layer structure, which is derived from a phase separation phenomenon of a glass composition, and which includes a white opaque layer having relatively high whiteness, and a white transparent layer having relatively low whiteness in this order from an inner side to an outer side, in part or the whole of the white glass container. The method includes the following first(') and second(') processes.

First(') process: Process of preparing a glass composition having the following glass blending composition on the basis of the total amount, and melting the glass composition $SiO_2$: 45% by weight to 58% by weight
$P_2O_5$: 2% by weight to 8% by weight
$Al_2O_3$: 5% by weight to 9% by weight
$B_2O_3$: 5% by weight to 13% by weight
$Na_2O$: 5% by weight to 12% by weight K$_2$O: 1% by weight to 6% by weight
ZnO: 3% by weight to 10% by weight
CaO: 3% by weight to 10% by weight Second(') process: Process of of molding and gradually cooling the glass composition, which is melted, by using a mold and cooling air according to a blow method to obtain the white glass container having a multi-layer structure derived from the phase separation phenomenon of the glass composition in part or the whole of the white glass container.

That is, when manufacturing the white glass container in this manner, a significant amount of fluorine compound is not contained. According to this, it is possible to efficiently obtain a white glass container having the multi-layer structure (two-layer structure), which is derived from the phase separation phenomenon of the glass composition, in part or the whole of the white glass container by performing molding by using a predetermined mold and the like without depending on melting conditions or molding conditions of the glass composition.

In addition, when carrying out the method of manufacturing the white glass container of the invention, it is preferable that in the first process or the first(') process, moisture is blended and a bubbling treatment is performed to melt and stir the glass composition.

When performing the bubbling treatment by blending moisture as described above, it is possible to efficiently obtain a white glass container in which various glass components, particularly, glass raw materials such as calcium phosphate are uniformly mixed, and thus a glass blending composition becomes uniform and a surface state or whiteness is more satisfactory.

BRIEF DESCRIPTION OF DRAWINGS

FIGS. 6a to 6d are diagrams (second diagrams) illustrating the method of manufacturing the white glass container having the three-layer structure according to the one-press method;

BEST MODE(S) FOR CARRYING OUT THE INVENTION

Figure 1A:
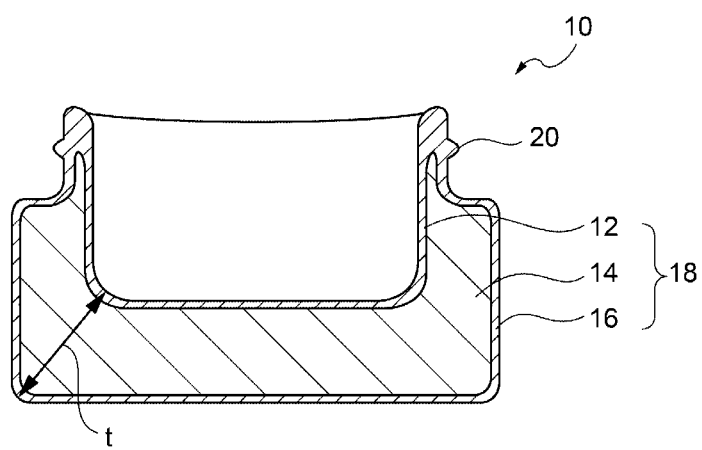
FIGS. 1a and 1b are diagrams illustrating a multi-layer structure (three-layer structure) in a white glass container that is manufactured by a one-press method.

[First Embodiment]
A first embodiment relates to a white glass container which is derived from a phase separation phenomenon of a glass composition having the following glass blending composition on the basis of the total amount. As shown in FIGS. 1a and 1b, or FIGS. 2a and 2b, white glass containers 10, 10', 30, and 30' have multi-layer structures 18, 18', 36, and 36' in part or the whole of the white glass container, respectively. Each of the multi-layer structures 18, 18', 36, and 36' includes white transparent layers 12 and 16, white transparent layers 12' and 16', a white transparent layer 34, or a white transparent layer 34' which has relatively low whiteness, and a white opaque layer 14, 14', 32, or 32' which has relatively high whiteness in this order from an inner side to an outer side. According to this, it is possible to solve the above-described problems.

SiO$_2$: 45% by weight to 58% by weight
P$_2$O$_5$: 2% by weight to 8% by weight
Al$_2$O$_3$: 5% by weight to 9% by weight
OB$_2$O$_3$: 5% by weight to 13% by weight
Na$_2$O: 5% by weight to 12% by weight
K$_2$O: 1% by weight to 6% by weight
ZnO: 3% by weight to 10% by weight
CaO: 3% by weight to 10% by weight Hereinafter, the white glass containers according to the first embodiment will be described in details with reference to the attached drawings.

1. Glass Components
(1) SiO$_2$

SiO$_2$ is a basic component that forms a network structure of glass in a multi-layer structure that constitutes a white glass container. That is, SiO$_2$ basically has an amorphous structure and is a glass component for exhibition of excellent mechanical strength, weather resistance, or glossiness.

Here, a blending amount of SiO$_2$ is set to a value within the range of 45% by weight to 58% by weight on the basis of the total amount (100% by weight) of glass components.

The reason of the limitation is as follows. When the blending amount of SiO$_2$ is below 45% by weight, weather resistance or humidity resistance of the white glass container may decrease in some cases.

On the other hand, when the blending amount of SiO$_2$ exceeds 58% by weight, a melting temperature of the glass components may excessively increase or uniform mixing properties with other glass components may decrease in some cases.

Accordingly, in consideration of satisfactory balance between the melting temperature of the glass components and the weather resistance and the like, it is preferable that the blending amount of SiO$_2$ is set to a value within the range of 43% by weight to 56% by weight, and more preferably a value within the range of 45% by weight to 53% by weight.

In addition, typically, it can be said that the blending amount of SiO$_2$ is necessary to be set to a value of 60% by weight to 65% by weight because the weather resistance or water resistance of glass may excessively decrease in some cases. However, in the first embodiment, it is possible to decrease the blending amount of SiO$_2$ to 58% by weight or less without a decrease in the weather resistance or the water resistance of glass due to a combination with other glass components.

(2) P$_2$O$_5$

In addition, P$_2$O$_5$ is a basic glass component that causes a phase separation phenomenon due to a relationship with SiO$_2$, thereby promoting whitening of glass.

Accordingly, it is preferable that a blending amount of P$_2$O$_5$ is to a value within the range of 2% by weight to 8% by weight on the basis of the total amount of the glass composition.

The reason of the limitation is as follows. When the blending amount of P$_2$O$_5$ becomes a value of below 2% by weight, the phase separation is not sufficient, and whiteness of glass may not be sufficient or the glass may be colored in some cases.

On the other hand, when the blending amount of $P_2O_5$ exceeds a range of 8% by weight, it is difficult to obtain uniform dispersibility with $SiO_2$, and thus unevenness in a white color increases. As a result, the beauty of glass may be damaged in some cases.

Accordingly, in consideration of more satisfactory balance between the whiteness and the beauty, it is preferable that the blending amount of $P_2O_5$ is set to a value within the range of 3% by weight to 7.5% by weight, and more preferably a value within the range of 4% by weight to 7% by weight.

However, in a glass composition composed of $P_2O_5$ and $SiO_2$, even when increasing the blending amount of $P_2O_5$, an increase in whiteness is not sufficient. That is, phase separation of $P_2O_5$ from a $SiO_2$ component effectively occurs at first in cooperation with other glass components, thereby forming phase-separation grains, which have a constant size and have refractive indexes different from each other, in a colloidal region. According to this, it is possible to obtain glass having high whiteness.

Accordingly, it is preferable to determine the blending amount of $P_2O_5$ as a component of glass while considering the blending amount of other glass components in such a manner that in phase-separation grains that constitute a part (island portion) of the phase separation region, an amount of P becomes a value within the range of 4% by mole to 20% by mole on the basis of the total amount (100% by mole) of the phase-separation grains, and in a colloidal region that constitutes a part (sea portion) of the phase separation region, an amount of P becomes a value of below 4% by mole on the basis of the total amount (100% by mole) of the colloidal region.

(3) $Al_2O_3$ $Al_2O_3$ exhibits a function of decreasing chemical durability or a coefficient of thermal expansion of the white glass container, and has a function of improving dispersion stability between $SiO_2$ and other components, thereby making phase separation of glass uniform and easy.

Accordingly, a blending amount of $Al_2O_3$ is set to a value within the range of 5% by weight to 9% by weight on the basis of the total amount of the glass composition.

The reason of the limitation is as follows. When the blending amount of $Al_2O_3$ becomes a value of below 5% by weight, uniform dispersion between $SiO_2$ and other components may be deficient in some cases, and thus unevenness tends to occur in the white glass that can be obtained.

On the other hand, when the blending amount of $Al_2O_3$ exceeds 9% by weight, the melting temperature of the glass composition significantly increases, and thus moldability may excessively decrease in some cases.

Accordingly, for more satisfactory balance between dispersion stability and the melting temperature of the glass composition and the like, it is preferable that the blending amount of $Al_2O_3$ is set to a value within the range of 5.5% by weight to 8.5% by weight, and more preferably 6% by weight to 8% by weight.

(4) $B_2O_3$

In addition, $B_2O_3$ is a glass component which exhibits a flux effect to decrease viscosity of the glass composition at a high temperature, and which also improves moldability and weather resistance of the white glass container that can be obtained.

Accordingly, the blending amount of $B_2O_3$ is set to a value within the range of 5% by weight to 13% by weight on the basis of the total amount of the glass composition.

The reason of the limitation is as follows. When the blending amount of $B_2O_3$ becomes a value of below 5% by weight, meltability of the glass composition or moldability of the white glass container that can be obtained may significantly decrease in some cases. In contrast, when the blending amount of $B_2O_3$ exceeds 13% by weight, the melting temperature of the glass composition may excessively increase in some cases.

Accordingly, for more satisfactory balance between the meltability of the glass composition, the moldablity of the white glass container that can be obtained, and the like, it is preferable that the blending amount of $B_2O_3$ is set to a value within the range of 6% by weight to 12% by weight on the basis of the total amount, and more preferably a value within the range of 8% by weight to 10% by weight.

(5) $Na_2O$ $Na_2O$ is a glass component that improves meltability of the glass composition and decreases viscosity, thereby improving moldability of the white glass container.

Accordingly, a blending amount of $Na_2O$ is set to a value within the range of 5% by weight to 12% by weight on the basis of the total amount of the glass composition.

The reason of the limitation is as follows. When the blending amount of $Na_2O$ becomes a value of below 5% by weight, the addition effect of decreasing the viscosity may not be exhibited in some cases. In contrast, when the blending amount exceeds 12% by weight, weather resistance of glass excessively decreases, a coefficient of thermal expansion of glass excessively increases, or a phase separation reaction is blocked, and thus the whiteness may decrease in some cases.

Accordingly, in consideration of more satisfactory balance between the addition effect of $Na_2O$, meltability of the glass composition, and the like, it is preferable that the blending amount of $Na_2O$ is set to a value within the range of 6% by weight to 10% by weight, and more preferably a value within the range of 7% by weight to 9% by weight.

(6) $K_2O$

In addition, $K_2O$ is a glass component that is added to make a temperature inclination gentle during melting of the glass composition so as to obtain a broad working temperature range and to suppress movement of Na ions in glass due to a so-called mixed alkali effect so as to bring glossiness on a glass surface.

Accordingly, a blending amount of $K_2O$ is set to a value within the range of 1% by weight to 6% by weight on the basis of the total amount of the glass composition.

The reason of the limitation is as follows. When the blending amount of $K_2O$ becomes a value of below 1% by weight, the addition effect and the like may not be exhibited in some cases. In contrast, when the blending amount of $K_2O$ exceeds 6% by weight, the melting temperature of the glass composition may be excessively raised in some cases.

Accordingly, in consideration of more satisfactory balance between the addition effect of $K_2O$, the meltability of the glass composition, and the like, it is preferable that the blending amount of $K_2O$ is set to a value within the range of 1.5% by weight to 5% by weight, and more preferably a value within the range of 2% by weight to 4.5% by weight.

(7) ZnO

In addition, ZnO is a glass component which exhibits a flux effect by addition in a small amount, thereby increasing the meltability of the glass composition, and which decreases a coefficient of thermal expansion or improves weather resistance.

Accordingly, a blending amount of ZnO is set to a value within the range of 3% by weight to 10% by weight on the basis of the total amount of the glass composition.

The reason of the limitation is as follows. When the blending amount of ZnO becomes a value of below 3% by weight, the addition effect and the like may not be exhibited in some cases.

On the other hand, when the blending amount of ZnO exceeds 10% by weight, the meltability of the glass composition decreases, and thus surface smoothness of the white glass that can be obtained disappears. As a result, the glass surface may be a rough mat shape in some cases.

Accordingly, in consideration of more satisfactory balance between the addition effect, the meltability of the glass composition, and the like, it is preferable that the blending amount of ZnO is set to a value within the range of 2% by weight to 8% by weight, and more preferably a value within the range of 3% by weight to 6% by weight.

(8) CaO

In addition, CaO exhibits a function of reducing the viscosity of the glass composition at a high temperature and is blended as a supply raw material of $P_2O_5$ which is suitable for the phase separation reaction.

Accordingly, a blending amount of CaO is set to a value within the range of 3% by weight to 10% by weight on the basis of the total amount of the glass composition.

The reason of the limitation is as follows. When, the blending amount of CaO becomes a value of below 3% by weight, the phase separation reaction deteriorates, and thus the whiteness may significantly decrease in some cases. In contrast, when the blending amount of CaO exceeds 10% by weight, the melting temperature of the glass composition may be raised, or a coefficient of thermal expansion may increase in some cases.

Accordingly, in consideration of more satisfactory balance between whiteness, the melting temperature of the glass composition, and the like in the glass container that can be obtained, it is preferable that the blending amount of CaO is set to a value within the range of 5% by weight to 9% by weight, and more preferably a value within the range of 6% by weight to 8% by weight.

(9) $LiO_2$, $SO_3$, and BaO (9)-1 $LiO_2$ $LiO_2$ is a glass component that increases the meltability of the glass composition, moldability of the white glass container that can be obtained, and the like by addition in a relatively small amount.

Accordingly, it is preferable that a blending amount of $LiO_2$ is set to a value within the range of 0.1% by weight to 5% by weight on the basis of the total amount of the glass composition.

The reason of the limitation is as follows. When the blending amount of $LiO_2$ becomes a value of below 0.1% by weight, the meltability of the glass composition may excessively decrease in some cases. On the other hand, when the blending amount of $LiO_2$ exceeds 5% by weight, the moldability of the white glass container than can be obtained may significantly decrease in some case.

Accordingly, it is preferable that the blending amount of $LiO_2$ is set to a value within the range of 0.5% by weight to 4% by weight on the basis of the total amount, and more preferably a value within the range of 1% by weight to 3% by weight.

(9)-2 $SO_3$ $SO_3$ is a preferred glass component when considering that $SO_3$ improves the meltability of the glass composition that becomes the white glass, and increases the whiteness of the white glass that can be obtained.

That is, it is preferable that the blending amount of $SO_3$ is set to a value within the range of 0.1% by weight to 5% by weight on the basis of the total amount of the glass composition.

The reason of the limitation is as follows. When the blending amount of $SO_3$ becomes a value of below 0.1% by weight, the meltability of the glass composition, the moldability or whiteness of the white glass container that can be obtained, and the like may excessively decrease in some cases. On the other hand, when the blending amount of $SO_3$ exceeds 5% by weight, a problem of excessive foaming during melting of the glass composition, and the like may occur in some cases.

Accordingly, in consideration of more satisfactory balance between the meltability of the glass composition, foamability during melting of the glass composition, and the like, it is preferable that the blending amount of $SO_3$ is set to a value within the range of 0.2% by weight to 3% by weight on the basis of the total amount, and more preferably a value within the range of 0.5% by weight to 2% by weight.

(9)-3 BaO

BaO is a glass component that increases the meltability of the glass composition, the moldability of the white glass container that can be obtained, and the like by addition in a relatively small amount.

That is, it is preferable that BaO is set to a value within the range of 0.1% by weight to 5% by weight on the basis of the total amount of the glass composition.

The reason of the limitation is as follows. When the blending amount of BaO becomes a value of below 0.1% by weight, the meltability of the glass composition may excessively decrease in some cases. On the other hand, when the blending amount of BaO exceeds 5% by weight, the moldability of the white glass container that can be obtained may significantly decrease in some cases.

Accordingly, it is preferable that the blending amount of BaO is set to a value within the range of 0.5% by weight to 4% by weight on the basis of the total amount, and more preferably a value within the range of 1% by weight to 3% by weight.

(10) Other Glass Components

Furthermore, it is preferable that the glass composition contains at least one metal oxide selected from a group consisting of $TiO_2$, MgO, SrO, $ZrO_2$, $Sb_2O_3$, $Cs_2O$, $SnO_2$, and PbO.

That is, $TiO_2$ is preferred glass component when considering that $TiO_2$ improves the whiteness of the white glass container that can be obtained, increases the meltability of the glass composition, and decreases a coefficient of thermal expansion or promotes a dispersion effect of $Al_2O_3$.

In addition, MgO is a preferred glass component when considering that MgO decreases a coefficient of thermal expansion of glass or promotes the dispersion effect of $Al_2O_3$.

Further, SrO is a preferred glass component when considering that SrO has an effect of improving the meltability of the glass composition.

Accordingly, it is preferable that the blending amount of each of the glass components is set to a value within the range of 0.1% by weight to 10% by weight on the basis of the total amount of the glass component.

The reason of the limitation is as follows. When each blending amount is a value of below 0.1% by weight, the addition effect may not be exhibited in some cases. On the other hand, when each blending amount exceeds 10% by weight, the meltability of the glass composition may decrease in the case of $TiO_2$ or MgO, or the coefficient of thermal expansion of glass may increase in the case of SrO.

In addition, when using the glass components in combination with MgO or SrO, a so-called solid-solution effect can be obtained, and thus the coefficient of thermal expansion of glass is decreased while improving the meltability of the glass composition. Accordingly, MgO and SrO are very suitable glass components.

Furthermore, $ZrO_2$ is very suitable glass component when considering that $ZrO_2$ causes whitening of glass and significantly improves chemical durability. A very appropriate blending amount of $ZrO_2$ is set to a value within the range of 0.1% by weight to 5% by weight on the basis of the total amount.

The reason of the limitation is as follows. When the blending amount of $ZrO_2$ becomes a value of below 0.1% by weight, the addition effect may not be exhibited in some cases. In contrast, when the blending amount of $ZrO_2$ exceeds 5% by weight, the whiteness may decrease in some cases.

In addition, when considering that $Sb_2O_3$ improves defoaming of glass, or $As_2O_3$, $SnO_2$, and PbO improve the whiteness of glass or improves the chemical durability of glass, $Sb_2O_3$, $As_2O_3$, $SnO_2$, and PbO are very suitable glass components.

In addition, it is preferable that a blending amount of $Sb_2O_3$ is set to a value within the range of 0.1% by weight to 1% by weight on the basis of the total amount of the glass composition.

The reason of the limitation is as follows. When the blending amount of $Sb_2O_3$ becomes a value of below 0.1% by weight, the addition effect thereof may not be exhibited in some cases. On the other hand, when the blending amount exceeds 1% by weight, the defoaming effect may decrease in some cases.

Similarly, it is preferable that a blending amount of $As_2O_3$ is set to a value within the range of 0.1% by weight to 10% by weight, a blending amount of $SnO_2$ is set to a value within the range of 0.1% by weight to 10% by weight, and a blending amount of PbO is set to a value within the range of 0.1% by weight to 10% by weight.

The reason of the limitation is as follows. When each of the blending amounts becomes a value of below 0.1% by weight, the addition effect may not be exhibited in some cases. In contrast, when the blending amount of $SnO_2$ exceeds 10% by weight, a softening point may significantly increase in some cases. Furthermore, in the case of $As_2O_3$ or PbO, when the blending amount exceeds 10% by weight, respectively, a coefficient of thermal expansion may increase, whiteness may decrease, or weather resistance may decrease in some cases.

In addition, even when the glass composition contains polyvalent oxides composed of $Nb^{5+}$, $Ta^{5+}$, $W^{6+}$, and $Mo^{6+}$ in addition to the above-described oxides, it is confirmed that excellent phase separation effect can be obtained. Furthermore, it is suitable that a coloring agent is added to the glass components to color glass in a favorable color tone such as a pastel color.

For example, when using coloring agents including $Co^{2+}$, $Cu^{2+}$, $Fe^{2+}$, $Ni^{2+}$, $Co^{3+}$, $Cr^{3+}$, $Fe^{3+}$, $Mn^{3+}$, $Nb^{3+}$, $Pr^{3+}$, $Er^{3+}$, $Cr^{6+}$, and the like in the glass components, various kinds of coloring and the pastel color can be realized, and thus the coloring agents are very suitable glass components.

On the other hand, when desiring to obtain a glass container which is not colored and is abundant in whiteness, it is preferable that the content of Fe ions contained in the glass composition is set to a value of equal to or less than 250 ppm.

That is, for example, when the content of Fe ions contained in the glass composition exceeds 250 ppm, in a case where the Fe ions are reduced from trivalent ions to bivalent ions, it was found that the glass composition tends to be colored in a bluish celadon-like color.

Accordingly, in a case of desiring to obtain a white glass container which is not colored and which is abundant in whiteness, it is preferable that the content of Fe ions contained in the glass composition is set to, for example, a value of equal to or less than 250 ppm, more preferably a value within the range of 50 ppm to 220 ppm, and still more preferably a value within the range of 100 ppm to 200 ppm.

However, in a case of desiring to obtain a white glass container that is colored in a celadon-like color, it is preferable that the content of Fe ions contained in the glass composition is set to a value, for example, within the range that is above 250 ppm and equal to or less than 800 ppm, more preferably a value within the range of 300 ppm to 600 ppm, and still more preferably a value within the range of 350 ppm to 500 ppm.

(11) Oxidizing Agent

In addition, it is preferable that the glass composition contain $CeO_2$ as an oxidizing agent and a blending amount of $CeO_2$ is set to a value within the range of 0.1% by weight to 2% by weight on the basis of the total amount of the glass composition.

The reason of the limitation is as follows. When water for dispersion of the glass components is added from the outside to the glass composition, and thus it enters a reducing atmosphere, $CeO_2$ as the oxidizing agent returns the reducing atmosphere to an oxidizing atmosphere, thereby effectively preventing coloring of the glass composition due to iron ions and the like.

Accordingly, it is preferable that a blending amount of $CeO_2$ as the oxidizing agent is set to a value within the range of 0.2% by weight to 1.5% by weight on the basis of the total amount, and more preferably 0.4% by weight to 1% by weight.

(12) Decoloring Component

In addition, it is preferable that the glass composition contains $Er_2O_3$, and a blending amount of $Er_2O_3$ is set to a value within the range of 0.01% by weight to 0.5% by weight on the basis of the total amount.

The reason is as follows. In a case where the white glass container tends to be colored in a yellow-green-based color, when containing $Er_2O_3$ that functions as a decoloring agent, it is possible to effectively prevent coloring of the white glass container by using a complementary color relationship of $Er_2O_3$.

Accordingly, it is preferable that a blending amount of $Er_2O_3$ as the decoloring component is set to a value within the range of 0.02% by weight to 0.1% by weight on the basis of the total amount, and more preferably a value within the range of 0.03% by weight to 0.08% by weight.

However, in a case of desiring to obtain a reddish-white glass container, $Er_2O_3$ is a particularly preferred blending component, and it can be said that $Er_2O_3$ is preferably used in an abundant amount to some extent.

That is, in this case, it is preferable that the blending amount of $Er_2O_3$ is set to a value within the range of above 0.5% by weight and equal to or less than 5% by weight on the basis of the total amount of the glass component, more preferably a value within the range of 0.8% by weight to 4% by weight, and still more preferably a value within the range of 1% by weight to 3% by weight.

(13) Cullet Component

In addition, it is preferable that the glass composition contains a predetermined amount of cullet component.

The reason of the preference is as follows. When containing the cullet component, dissolubility or uniformity of the glass composition is improved, and a glass composition that is discarded can be used again, and thus there is an economical and environmental advantage.

Accordingly, it is preferable that the cullet component is set to a value within the range of 5% by weight to 50% by weight on the basis of the total amount of the glass composition, more preferably a value within the range of 10% by weight to 40% by weight, and still more preferably a value within the range of 15% by weight to 30% by weight.

2. Multi-Layer Structure

Figure 1B:
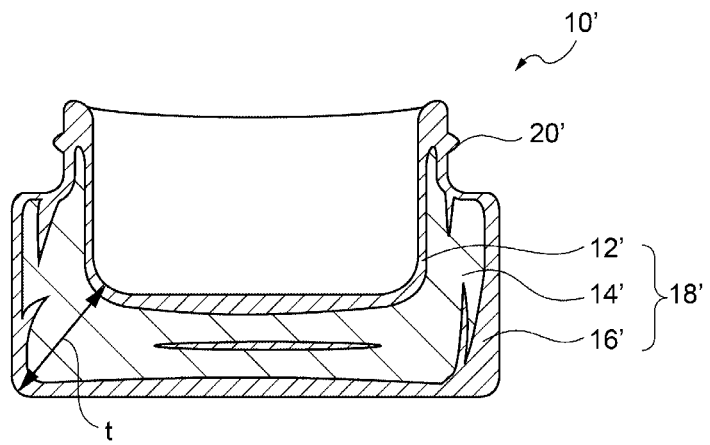

As shown in FIGS. 1a and 1b, in the white glass container 10 or 10', the multi-layer structure (three-layer structure) 18 or 18', which is derived from a phase separation phenomenon of the glass composition and which includes the white transparent layer 12 or 12' having relatively low whiteness, the white opaque layer 14 or 14' having relatively high whiteness and the white transparent layer 16 or 16' having relatively low whiteness in this order form an inner side to an outer side, is provided in part or the whole of the white glass container 10 or 10'.

Figure 2A:
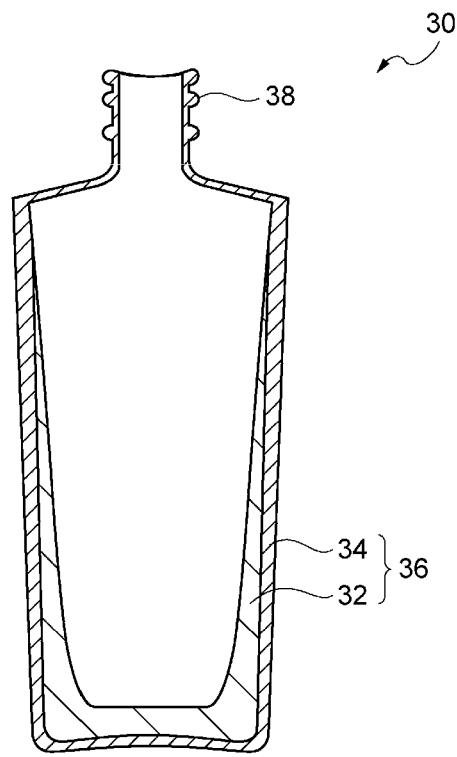
FIGS. 2a and 2b are diagrams illustrating a multi-layer structure (two-layer structure) in a white glass container that is manufactured by a blow method.
Figure 2B:
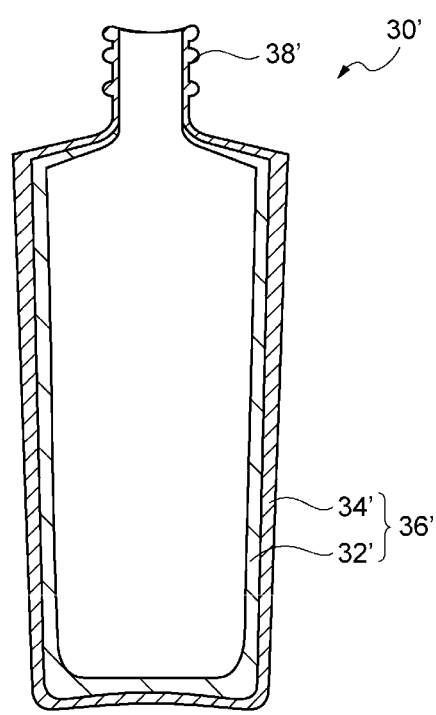

In addition, as shown in FIGS. 2a and 2b, in the white glass container 30 or 30', the multi-layer structure (two-layer structure) 36 or 36', which is derived from the phase separation phenomenon of the glass composition and which includes the white opaque layer 32 or 32' having relatively high whiteness, and the white transparent layer 34 or 34' having relatively low whiteness in this order from an inner side to an outer side, is provided in part or the whole of the white glass container 30 or 30'.

Hereinafter, the multi-layer structure, which includes a phase separation region, in the white glass container will be described in detail by dividing the multi-layer structure into the white transparent layer and the white opaque layer that constitute the multi-layer structure.

(1) White Transparent Layer

In addition, the white transparent layers 12, 12', 16, and 16', which are illustrated in FIGS. 1a and 1b, and the like, are mainly provided for mechanical protection of the white opaque layers 14 and 14', and are provided to increase overall whiteness of the white glass containers 10 and 10'. The white transparent layers 12, 12', 16, and 16' are glass regions in an amorphous state in which a degree of phase separation is low, phase separation grains are relatively less, and colloidal regions are relatively much.

Accordingly, it is preferable that the thickness of each of the white transparent layers is set to a value within the range of 0.1 mm to 10 mm.

The reason of the limitation is as follows. When the thickness of the white transparent layer becomes a value of below 0.1 mm, it may be difficult to secure the mechanical protection of the white opaque layer in some cases. On the other hand, when the thickness of the white transparent layer exceeds 10 mm, overall whiteness of the glass container may significantly decrease in some cases.

Accordingly, it is preferable that the thickness of the white transparent layer is set to a value within the range of 0.5 mm to 8 mm, and more preferably a value within the range of 2 mm to 5 mm.

In addition, it is preferable that a visible ray transmittance of the white transparent layer is set to a value within the range of 5% to 50%.

The reason of the limitation is as follows. When the visible ray transmittance of the white transparent layer becomes below 5%, opacity thereof increases, and thus visibility of the white opaque layer, which is an underlying layer and which is abundant in whiteness, decreases. As a result, whiteness as the white glass container may significantly decrease in some cases.

On the other hand, when the visible ray transmittance of the white transparent layer exceeds 50%, transparency excessively increases, and thus whiteness of a screw portion and the like significantly decreases. As a result, integral whiteness as the white glass container may be significantly damaged in some cases.

Accordingly, it is preferable that the visible ray transmittance of the white transparent layer is set to a value within the range of 10% to 40%, and more preferably a value within the range of 15% to 30%.

(2) White Opaque Layer

In addition, the white opaque layers 14 and 14' that are illustrated in FIGS. 1a and 1b, and the like are provided to increase overall whiteness of the white glass containers 10 and 10'. The white opaque layers 14 and 14' are glass regions in an amorphous state in which the degree of phase separation is high, the phase separation grains are relatively much, and the colloidal regions are relatively less.

Accordingly, it is preferable that the thickness of each of the white opaque layers is set to a value within the range of 3 mm to 25 mm.

The reason of the limitation is as follows. When the thickness of the white opaque layer becomes below 3 mm, overall whiteness of the glass container may significantly decrease in some cases. On the other hand, when the thickness of the white opaque layer exceeds 25 mm, it may be difficult to secure the mechanical protection of the white opaque layer in some cases.

Accordingly, it is preferable that the thickness of the white opaque layer is set to a value within the range of 5 mm to 20 mm, and more preferably a value within the range of 7 mm to 15 mm.

In addition, it is preferable that the visible ray transmittance of the white opaque layer is set to a value of equal to or less than 2%.

The reason of the limitation is as follows. When the visible ray transmittance exceeds 2%, transparency increases, and thus whiteness as the white glass container may significantly decrease in some cases.

However, when the visible ray transmittance of the white opaque layer is set to be excessively low, a kind of glass components that can be used may be excessively limited, or a yield ratio during production may excessively decrease in some cases.

Accordingly, it is more preferable that the visible ray transmittance of the white opaque layer is set to a value within the range of 0.01% to 1.5%, and still more preferably a value within the range of 0.1% to 0.8%.

3. White Glass Container (1) Basic Shape

A basic shape of the glass container is not particularly limited, and examples thereof include a bottleneck-type glass bottle, a rectangular glass bottle, a cylindrical glass bottle, a glass bottle having an irregular shape, a rectangular glass box, a cylindrical glass box, a glass box having an irregular shape, and the like in accordance with a use.

Here, the rectangular white glass containers 10 and 10', which are illustrated in FIGS. 1a and 1b, and the like, may be exemplified as a typical example.

More specifically, FIGS. 1a and 1b illustrate rectangular white glass containers 10 and 10', each including a quadrangular prism-shaped body portion (a side wall and the bottom) having an approximately rectangular planar shape and a cylindrical neck portion.

In addition, FIG. 1a illustrates the white glass container 10 in which phase separation occurs in a complete manner and which includes a three-layer structured body portion (a side wall and the bottom). FIG. 1b illustrates the white glass container 10' in which the phase separation occurs in an approximately complete manner, but a three-layer structured body portion (a side wall and the bottom) including an incomplete phase separation region is included.

Furthermore, the rectangular white glass containers 10 and 10', which are shown in FIGS. 1a and 1b, respectively include the thickest portion between the side wall and the bottom, for example, a portion having a thickness (t) of 1 cm to 5 cm. Whiteness of the thickest portion is high, and thus it can be said that high-grade sensation or the beauty is high.

Accordingly, the white glass containers 10 and 10' have no particular difference in appearance as a basic shape and can be used as white glass containers 10 and 10' which are suitable for a make-up cream container having high-grade sensation and high decorativeness, and the like without separately providing a decoration layer.

In addition, bottleneck-type white glass containers 30 and 30', which are illustrated in FIGS. 2a and 2b, and the like, may be exemplified as another typical example.

In addition, FIG. 2a illustrates the bottleneck-type white glass container 30 in which the phase separation occurs in a complete manner and which includes a two-layer structured body portion (a side wall and the bottom) having a different thickness and a neck portion. FIG. 2b illustrates the bottleneck-type white glass container 30' which includes a two-layer structured body portion (a side wall and the bottom) having a uniform thickness and a neck portion.

That is, the white glass container 30 shown in FIG. 2a shows whiteness in a gradation pattern as a whole, and a relatively thick white opaque layer 32 showing strong whiteness is provided in an inner lower region. On the other hand, in an inner upper region, a relatively thin white opaque layer 32 showing strong whiteness is provided at a rear side of the white transparent layer 34, which has a uniform thickness, on a surface side. As described above, the white glass container 30 includes the two-layer structured body portion 36 having a different thickness.

On the other hand, the white glass container 30' shown in FIG. 2b shows satisfactory whiteness as a whole. The white opaque layer 32', which shows strong whiteness and which has a uniform thickness, is provided on both of an inner lower side region and on an inner upper side region. On the other hand, the white transparent layer 34' having a uniform thickness is directly provided on a surface side. As described above, the white glass container 30' includes the two-layer structured body portion 36' having a uniform thickness.

Both the white glass containers 30 and 30' can be used as white glass containers 30 and 30' which are suitable for a lotion container having high-grade sensation and high decorativeness, and the like without separately providing a decoration layer.

(2) Three-Layer Structure

A shape of the white glass container is not particularly limited. However, for example, as shown in a photograph of FIG. 3a which is taken from a side surface direction, the white glass container is a white glass container having a rectangular shape as a whole. As shown in a cross-sectional photograph of FIG. 3b, it is preferable to provide a multilayer structure of a three-layer structure, which is obtained by a one-press method and includes a phase separation region, at the side wall or the bottom.

That is, it is preferable to provide the three-layer structure, which includes a white transparent layer (first white transparent layer), a white opaque layer, and a white transparent layer (second white transparent layer) from an outer side to an inner side of the white glass container, at the side wall or the bottom.

The reason of the preference is as follows. Even when an external force or a load is applied from an outer side of the white glass container, satisfactory mechanical strength can be exhibited against the external force or the load due to the first white transparent layer that constitutes a part of the three-layer structure.

In addition, the first white transparent layer itself is not completely transparent and shows whiteness, and thus whiteness of the white glass container can be improved in combination with a white opaque layer to be described later.

In addition, when the white opaque layer that constitutes a part of the three-layer structure is included as an intermediate layer, whiteness of the white glass container can be significantly improved.

Furthermore, even when an external force or a load is applied from an inner side of the white glass container, satisfactory mechanical strength can be exhibited against the external force or the load due to the second white transparent layer that constitutes a part of the three-layer structure.

In addition, the white opaque layer is an amorphous region formed by a considerable degree of phase separation phenomenon of glass components, and thus the white opaque layer is excellent in whiteness, but the mechanical strength thereof is relatively low.

However, the white opaque layer is interposed between the first white transparent layer and the second white transparent layer as regions which are present on both sides of the white opaque layer and in which the degree of phase separation of the glass components is low, thereby forming a sandwich structure. As a result, it is possible to obtain a white glass container excellent in mechanical strength as a whole.

Furthermore, the neck portions (screw portions) 20 and 20' of the white glass containers 10 and 10' are relatively thin and are demanded to have considerable mechanical strength or dimensional stability. Accordingly, as shown in FIGS. 1a and 1b, and the like, it is preferable that each of the neck portions 20 and 20' is constituted by a single layer that continues from the white transparent layer 12, 12', 16, or 16' without including the white opaque layer.

In addition, it is also preferable that the neck portions 20 and 20' are formed form a white transparent layer that can be said as approximately transparent glass by appropriately changing a blending composition of glass components, the thickness, and the like.

(3) Two-Layer Structure

Figures 4A, 4B:
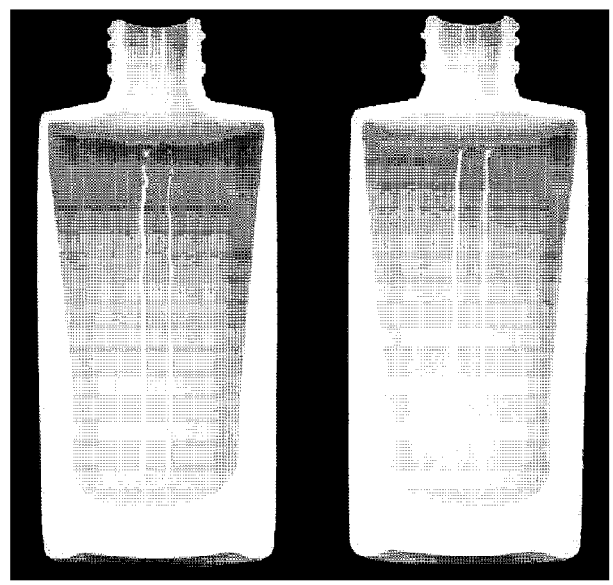
FIGS. 4a and 4b are photographs illustrating an example of a shape of the white glass container that is manufactured by the blow method.

In addition, with regard to the shape of the white glass container, as shown in cross-sectional photographs of FIGS. 4a and 4b (FIG. 4a is a right cross-sectional photograph, and FIG. 4b is a left cross-sectional photograph), the white glass container is a bottleneck-type white glass container as a whole, and it is preferable to have a two-layer structure, which is obtained by a blow method and the like and which has a different thickness, at the side wall or the bottom.

That is, since a white transparent layer is formed on a surface side of a white opaque layer as a region in which the degree of phase separation of glass components is low, it is possible to obtain a white glass container having excellent mechanical strength as a whole.

Furthermore, in a case of the bottleneck-type white glass container, the overall thickness thereof is small and balance is attained. Accordingly, as shown in FIG. 2a, it can be said that sufficiently excellent mechanical strength can be obtained with a two-layer structured body portion (the side wall or the bottom) 36.

In addition, as shown in FIG. 2a, when the thickness of the white opaque layer 32, or the white opaque layer 32 and the white transparent layer 34 varies from a lower side to an upper side, it is possible to make whiteness of the white glass container gradually vary.

Accordingly, as described above, for example, when the thickness of the white opaque layer, or the white opaque layer and the white transparent layer is made to gradually decrease from the lower side to the upper side, as shown in the cross-sectional photographs of FIGS. 4a and 4b, the lower side can be constituted by a side wall or the bottom which is abundant in whiteness, and the upper side can be constituted by a transparent side wall. Accordingly, it is possible to obtain a white gradation pattern without performing a coating treatment and the like, and thus it is possible to improve decorativeness of the white glass container.

Furthermore, even in the two-layer structure, it is also preferable that the neck portion 38 is constituted by a white transparent layer that can be said as approximately transparent glass by appropriately changing a blending composition of glass components, the thickness, and the like similar to the three-layer structure and the like.

(4) Modification Example of Two-Layer Structure

In addition, with regard to the shape of the white glass container, a bottleneck-type white glass container is provided as a modification example of the two-layer structure, and it is preferable that the bottleneck-type white glass container has the two-layer structure, which has a uniform thickness and which is obtained by a blow method and the like, at a side wall or the bottom.

That is, as shown in FIG. 2b, it is preferable to have the two-layer structure, which includes the white transparent layer 34' having a uniform thickness and the white opaque layer 32' from an outer side to an inner side of the white glass container 30', at the body portion (the side wall or the bottom) 36'.

The reason of the preference is as follows. Even when an external force or a load is applied from the outer side of the white glass container 30', satisfactory mechanical strength can be exhibited against the external force or the load due to the white transparent layer 34' having a uniform thickness.

In addition, the white transparent layer 34' is also subjected to partial phase separation and shows whiteness in many cases, and thus when the white opaque layer is provided on an inner side to come into contact with the white transparent layer, it is possible to improve whiteness of the white glass container.

In addition, a neck portion (screw portion) 38' of the bottleneck-type white glass container 30' is relatively thin, and is demanded to have considerable mechanical strength or dimensional stability. Accordingly, as shown in FIG. 2b, it is preferable that the neck portion 38' is constituted by a single layer that continues from the white transparent layer 34' without including the white opaque layer 32'.

Furthermore, even in the modification example of the above-described two-layer structure, it is also preferable that the neck portion 38' is constituted by a white transparent layer that can be said as approximately transparent glass by appropriately changing a blending composition of glass components, the thickness, and the like similar to the three-layer structure and the like.

[Second Embodiment]

A second embodiment relates a method of manufacturing a white glass container having a three-layer structure which is derived from a phase separation phenomenon of a glass composition and which includes a white transparent layer having relatively low whiteness, a white opaque layer having relatively high whiteness, and a white transparent layer having relatively low whiteness. The method includes the following first and second processes.

First process: Process of preparing a glass composition having the following glass blending composition on the basis of the total amount, and melting the glass composition $SiO_2$: 45% by weight to 58% by weight
$P_2O_5$: 2% by weight to 8% by weight
$Al_2O_3$: 5% by weight to 9% by weight
$B_2O_3$: 5% by weight to 13% by weight
$Na_2O$: 5% by weight to 12% by weight
$K_2O$: 1% by weight to 6% by weight
$ZnO$: 3% by weight to 10% by weight
$CaO$: 3% by weight to 10% by weight Second Process: Process of molding and gradually cooling the glass composition, which is melted, by using a mold and a plunger according to a one-press method to obtain the white glass container having a multi-layer structure including a phase separation region in part or the whole of the white glass container.

Hereinafter, the method of manufacturing the white glass container having the three-layer structure according to the second embodiment will be described in detail while appropriately referring to FIGS. 5a to 5c and FIGS. 6a to 6d.

1. First Process

The first process is a process of preparing a glass composition having a predetermined glass blending composition, that is, a glass composition having the glass blending composition described in the first embodiment, and of melting the glass composition.

In addition, when preparing the glass composition, with regard to a type of an alkali metal oxide or an alkali-earth metal oxide as a glass raw material, a carbonate compound is suitable. As a raw material of $P_2O_5$, dibasic calcium phosphate ($CaHPO_4$), calcium metaphosphate ($Ca(PO_3)_2$), sodium tripolyphosphate ($Na_5P_3O_{10}$), and dibasic sodium phosphate ($NaHPO_4$) are suitable.

In addition, it is preferable that in the first process, a predetermined amount of moisture is blended and a bubbling treatment is performed to melt and stir the glass composition.

The reason of the preference is as follows. When performing the bubbling treatment by blending moisture in this manner, it is possible to efficiently obtain a white glass container in which various glass components are uniformly mixed and thus a surface state is satisfactory.

However, instead of the bubbling treatment by the moisture blending, a bubbling treatment by a mechanical stirring unit is also possible. In addition, the bubbling treatment by the mechanical stirring unit and the bubbling treatment by the moisture blending may be used in combination.

In addition, when blending the moisture to perform the bubbling treatment, typically, it is preferable that a blending amount of the moisture is set to a value within the range of 0.1 g to 50 g on the basis of 1 kg of the glass composition.

That is, when setting the blending amount of the moisture to the value, it is possible to obtain a satisfactory stirring effect. In addition, it is possible to obtain white glass in which an excessive reducing region due to the moisture that is blended does not appear, and which is not excessively colored.

Accordingly, it is preferable that the blending amount of the moisture during performing the bubbling treatment is set to a value within the range of 0.5 g to 30 g on the basis of 1 kg of the glass composition, and more preferably a value within the range of 1 g to 25 g.

2. Second Process

In addition, the second process is a process of manufacturing a white glass container having a predetermined shape, which has a multi-layer structure in part or the whole of the white glass container, from the glass composition that is melted by a so-called one-press method.

That is, since the white glass container is manufactured by the one-press method in this manner, even when not containing a significant amount of fluorine compound, it is possible to efficiently obtain a white glass container having the multi-layer structure (three-layer structure), which includes a phase separation region, in part or the whole of the white glass container by using a predetermined mold and the like without depending on melting conditions or molding conditions of the glass composition.

More specifically, after molding a white glass container having a finish shape by a mold and a plunger for one-press, the white glass container is gradually cooled in the one-press mold as is, or by inverting the white glass container in a cooling mold.

At this time, a glass surface that comes into direct contact with an inner surface of the one-press mold, and a glass surface that comes into direct contact with the plunger are subjected to heat transfer and are quickly cooled, respectively. As a result, the degree of occurrence of phase separation phenomenon is low, thereby obtaining white transparent layers (a first white transparent layer and a second white transparent layer) having relatively low whiteness.

On the other hand, in molten glass that does not come into direct contact with the inner surface of the one-press mold and the plunger, quick cooling does not occur so much. As a result, the degree of occurrence of the phase separation phenomenon increases, thereby obtaining a white opaque layer having relatively high whiteness.

Still more specifically, as shown in FIGS. 5a to 5c and FIGS. 6a to 6d, it is preferable to manufacture the white glass container 10 from a glass gob 53 that is a molten material of a predetermined glass composition by the one-press method.

Figure 5A:
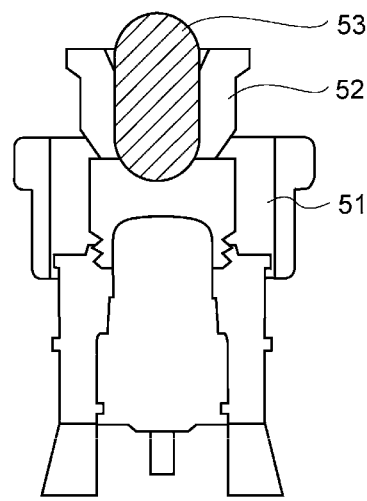
FIGS. 5a to 5c are diagrams (first diagrams) illustrating a method of manufacturing the white glass container having the three-layer structure according to the one-press method.

First, as shown in FIG. 5a, a molding mold 51 is provided, and then the glass gob 53 is put into the molding mold 51 through a funnel 52.

Figure 5B:
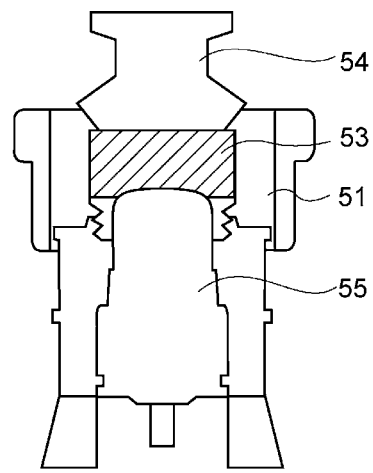
Figure 5C:
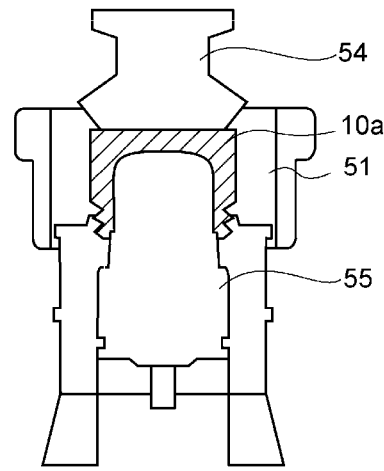

Then, as shown in FIGS. 5b and 5c, a baffle 54 is mounted instead of the funnel 52, and then a plunger 55 is inserted into the molding mold 51 that is filled with the glass gob 53. Then, the insertion state is maintained as is until cooling is performed to a certain degree at which a surface of the glass container 10a having a finish shape maintains a constant shape.

That is, in this molding process, the glass container 10a having a desired finish shape is formed.

Next, as shown in FIG. 6a, the molding mold 51 and the plunger 55 are pulled out, and then a glass container 10a having the finish shape is rotated (inverted) by 180° using a rotary device 60 that is provided with an arm 62 and is accommodated in a cooling mold 66 (66a and 66b).

That is, the glass container 10a having the finish shape is rotated in a state in which a mouth portion thereof is supported by a mouth mold 64 which is connected to the arm 62 and which is a part of the molding mold 51. In addition, the glass container 10a is accommodated and retained in the cooling mold 66 in such a manner that a gap is provided between an outer circumferential surface of the glass container 10a having the finish shape and the cooling mold 66.

At this time, in the glass container 10a having the finish shape which is moved into the cooling mold 66, the mouth portion is supported by a supporting portion of the cooling mold 66, and the bottom is placed on a bottom mold 66b as a mounting portion.

Next, as shown in FIG. 6b, a blow head 70 is disposed on an upper side of the cooling mold 66. At this time, the blow head 70 is disposed to be spaced away from a supporting portion that supports the mouth portion of the glass container 10a having the finish shape.

Next, as shown in FIG. 6c, a predetermined cooling air 72 is blown to the inside of the glass container 10a having the finish shape through the blow head 70 that is disposed on the upper side of the cooling mold 66.

At the same time, another cooling air 74 is blown to the gap provided between the outer circumferential surface of the glass container 10a having the finish shape and the cooling mold 66 from a lower side without directly blowing the cooling air to the glass container 10a having the finish shape.

According to this, the outer circumferential surface and the inner surface of the glass container 10a having the finish shape is efficiently cooled and thus it is possible to finish the glass container 10a as a final white glass container 10.

In addition, in the second process, it is preferable to use a mold (molding mold and cooling mold) subjected to a surface treatment by a solid lubricant on an inner side.

The reason of the preference is as follows. When manufacturing the white glass container by using the mold subjected to the surface treatment by the solid lubricant, it is possible to efficiently obtain the white glass container having a more satisfactory surface state.

That is, in a case of using a mold that is not subjected to the surface treatment by the solid lubricant, a wrinkle pattern may be formed at a side surface of the white glass container, which can be obtained, in some cases due to a variation in a blending composition of the glass components, a change in environmental conditions, and the like.

In contrast, in a case of using the mold subjected to the surface treatment by the solid lubricant, even when the variation in the blending composition of the glass components, the change in the environmental conditions, and the like occurs to a certain degree, it is possible to effectively suppress the formation of the wrinkle pattern at the side surface of the white glass container.

In addition, the surface treatment by the solid lubricant may be called a Defric coating treatment (provided by KAWAMURA RESEARCH.LAB., INC.), and represents a surface treatment of forming a lubricant film by the solid lubricant, which is composed of one kind or various kinds of molybdenum disulfide, tungsten disulfide, graphite, a fluorine resin, and the like, on a mold surface.

3. Third Process

In addition, the third process is a subsequent process of the second process, and is a flame polishing treatment process (fire polishing treatment process) that is an arbitrary process.

Figure 7:
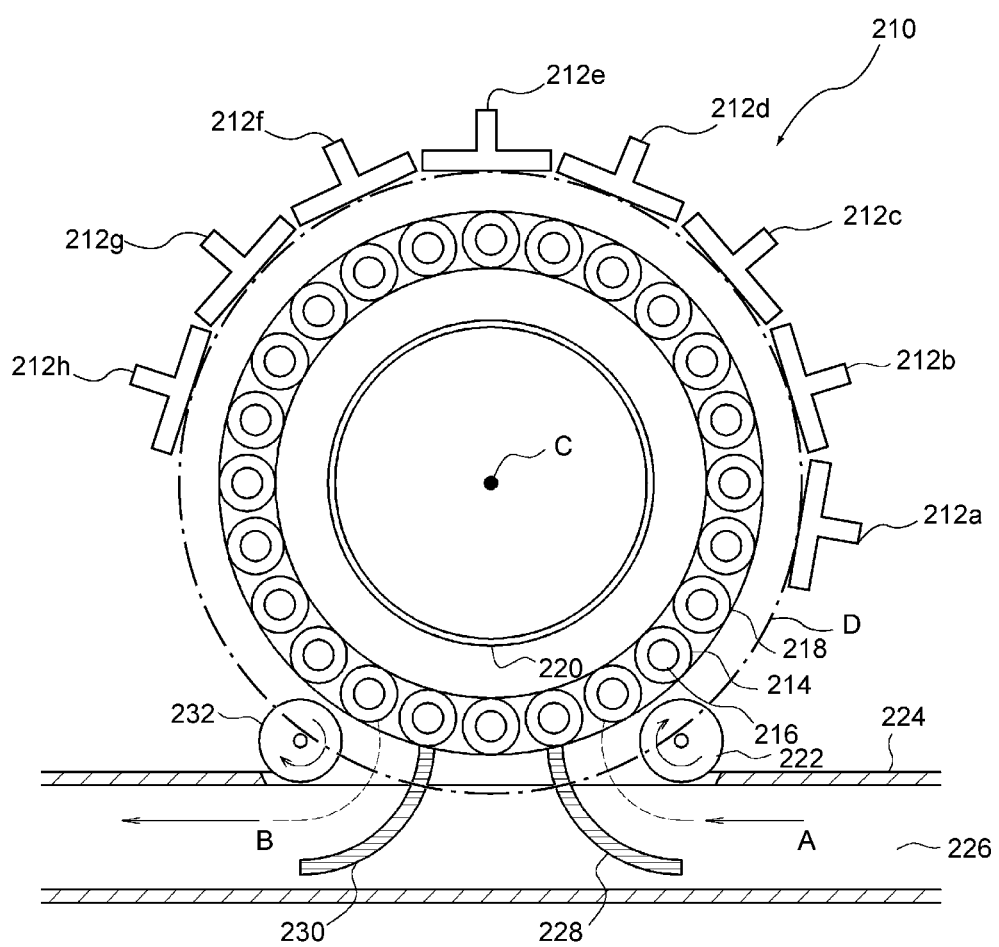
FIG. 7 is a diagram illustrating a flame polishing apparatus.

That is, it is preferable to perform the flame polishing treatment with respect to a surface of the white glass container that can be obtained in the second process by using a flame polishing treatment apparatus 210 as shown in FIG. 7.

More specifically, it is preferable to use the flame polishing treatment apparatus 210 for glass containers which includes a glass container supporting unit 214, a plurality of flame radiation units 212 (212a to 212h), a driving unit 218 that moves the glass container supporting unit 214 provided with a fixing unit 216 around a circular insulation and reflection member 220 in an arc shape, and rotary motors 222 and 232, and in which the plurality of flame radiation units 212 (212a to 212h) are radially disposed along a virtual movement curve D along which the glass container supporting unit 214 is moved.

The reason of the preference is as follows. When performing the flame polishing treatment by using the flame polishing treatment apparatus for glass containers, it is possible to efficiently obtain the white glass container in which a surface state of the white glass container is smooth and which shows satisfactory whiteness.

In addition, in a case of the flame polishing treatment apparatus 210 as shown in FIG. 7, a continuous flame polishing treatment is possible. In addition, a curved arm-shaped loading device 228 that loads the white glass container in a direction of an arrow A, a conveyor belt 226 that conveys the white glass container subjected to the flame polishing treatment in a direction of an arrow B, and an unloading device 230 are provided adjacently to the flame polishing treatment apparatus 210.

[Third Embodiment]

A third embodiment relates to a method of manufacturing a white glass container having a two-layer structure which is derived from the phase phenomenon of the glass composition and which includes a white transparent layer having relatively low whiteness, and a white opaque layer having relatively high whiteness. The method includes the following first(') and second(') processes.

First(') process: Process of preparing a glass composition having the following glass blending composition on the basis of the total amount, and melting the glass composition
  $SiO_2$: 45% by weight to 58% by weight
  $P_2O_5$: 2% by weight to 8% by weight
  $Al_2O_3$: 5% by weight to 9% by weight
  $B_2O_3$: 5% by weight to 13% by weight
  $Na_2O$: 5% by weight to 12% by weight
  $K_2O$: 1% by weight to 6% by weight
  ZnO: 3% by weight to 10% by weight
  CaO: 3% by weight to 10% by weight Second(') process: Process of molding and gradually cooling the glass composition, which is melted, by using a mold and cooling air according to a blow method to obtain the white glass container having a multi-layer structure derived from the phase separation phenomenon of the glass composition in part or the whole of the white glass container.

Hereinafter, the method of manufacturing the white glass container having the two-layer structure according to the third embodiment will be described in detail while appropriately referencing to FIGS. 8a to 8d.

1. First(') Process

The first(') process is the same as the process of preparing the glass composition having a predetermined glass blending composition which is a glass composition described in the first embodiment, and of melting the glass composition, and thus a description thereof will not be repeated again.

2. Second(') Process

The second(') process is a process of manufacturing a white glass container of a predetermined shape which has a multi-layer structure derived from the phase separation phenomenon of the glass composition in part or the whole of the white glass container from the glass composition that melted according to a so-called blow method (a blow and blow method or a press and blow method).

That is, when manufacturing the white glass container in this manner according to the blow method, a significant amount of fluorine compound is not contained. According to this, it is possible to efficiently obtain a white glass container having a multi-layer structure (two-layer structure), which includes a phase separation region, in part or the whole of the white glass container by using a predetermined mold and the like without depending on melting conditions or molding conditions of the glass composition.

More specifically, parison as an intermediate type of the white glass container is molded by using a parison molding mold (rough mold) and a settle blower, a white glass container having a finish shape is molded by a blow molding mold and cooling air, and the white glass container is gradually cooled in the blow molding mold as is, or by inverting the white glass container in a cooling mold, and the like.

At this time, a glass surface that comes into direct contact with an inner surface of the blow molding mold is subjected to heat transfer and is quickly cooled. As a result, the degree of occurrence of phase separation phenomenon is low, thereby obtaining a white transparent layer having relatively low whiteness.

On the other hand, a glass surface, which does not come into direct contact with the inner surface of the blow molding mold, comes into direct contact with the cooling air, but quick cooling does not occur so much. As a result, the degree of occurrence of the phase separation phenomenon increases, thereby obtaining a white opaque layer having relatively high whiteness.

Still more specifically, as shown in FIGS. 8a to 8d, it is preferable to manufacture the white glass container by the blow method (blow and blow method).

Figure 8A:
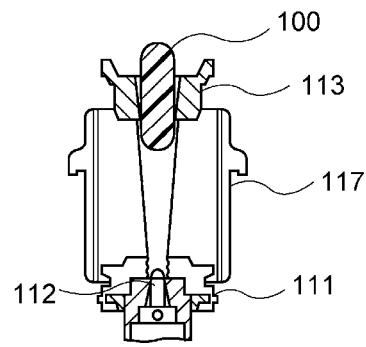
FIGS. 8a to 8d are diagrams illustrating a method of manufacturing the white glass container having the two-layer structure according to the blow method.
Figure 8B:
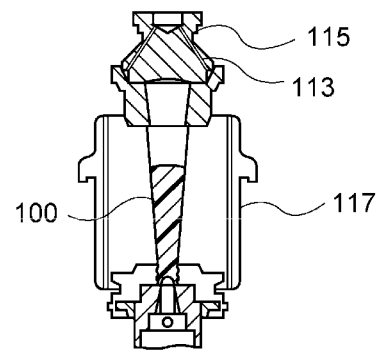

First, when performing primary molding, as shown in FIG. 8a, a rough mold 117 is provided, and a glass gob 100 is put into the rough mold 117 through a funnel 113. Then, as shown in FIG. 8b, the settle blower operates t blow air from an upper side through the battle 115, thereby pressing the glass gob 100 to a lower side.

Figure 8C:
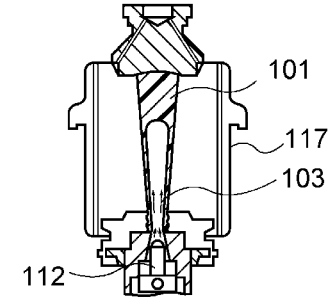

Then, as shown in FIG. 8c, in the rough mold 117, air for counter blow is blown from a front end of a plunger 112 from a lower side to form a parison 101.

Figure 8D:
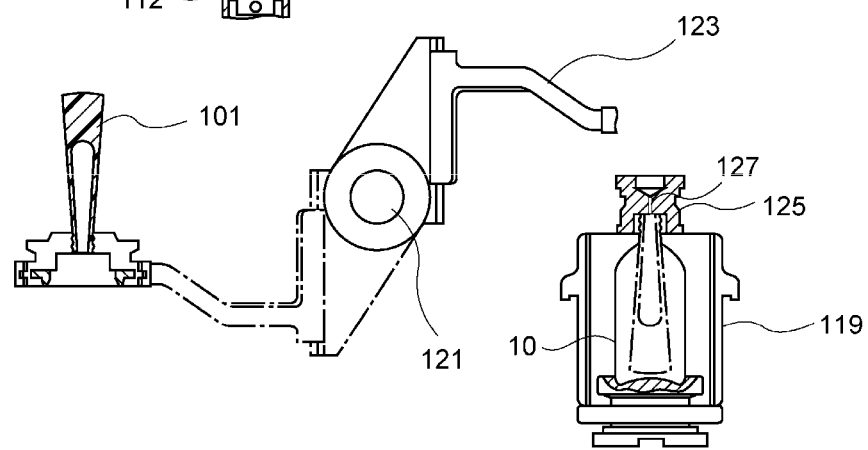

Next, secondary molding is performed. That is, as shown in FIG. 8d, the parison 101 that is obtained is rotated by 180° using a rotary device 121 that is provided with an arm 123 and is accommodated at a predetermined site inside a finish mold 119 as shown in FIG. 8d.

In addition, air for final blow is blown from an air blowing port 127 for final blow, which is provided to a mouth mold 125, to the inside of the parison 101, thereby performing molding into a desired glass container. Then, a white glass container 10 is taken out.

3. Third(') Process

The third(') process is a process of subjecting a surface of the white glass container to the flame polishing treatment. The contents of the third(') process are the same as that of the third process in the second embodiment, and thus a description thereof will not be repeated again.

EXAMPLES

Hereinafter, the invention will be described in detail with reference to Examples.

Example 1

1. Manufacturing of White Glass Container

First, glass raw materials were combined to obtain the following glass blending composition (in Table 1, described as Blending composition 1), and then the glass raw materials were dry-mixed for one hour by using a mixer, thereby obtaining a mixed glass raw material in a total amount of 1000 g.

$SiO_2$: 52% by weight
$P_2O_5$: 7% by weight
$Al_2O_3$: 7% by weight
$B_2O_3$: 10% by weight
$Na_2O$: 11% by weight
$K_2O$: 3% by weight
$ZnO$: 5% by weight
$CaO$: 5% by weight Next, the uniformly mixed glass raw material was accommodated in a magnetic container, and was melted by using an air-atmosphere-type resistive heating furnace under conditions of a melting temperature of 1400° C. and two hours. In addition, in the middle of the melting, the resultant molten glass was stirred in a plurality of times by using a platinum spatula to sufficiently realize homogenization in a glass blending composition.

Then, after confirming complete melting and clarification of glass components, the molten glass that was obtained was put into the one-press mold, and then the plunger was inserted into the mold, thereby obtaining a rectangular glass container having the same shape as the finish shape.

Figure 3A:
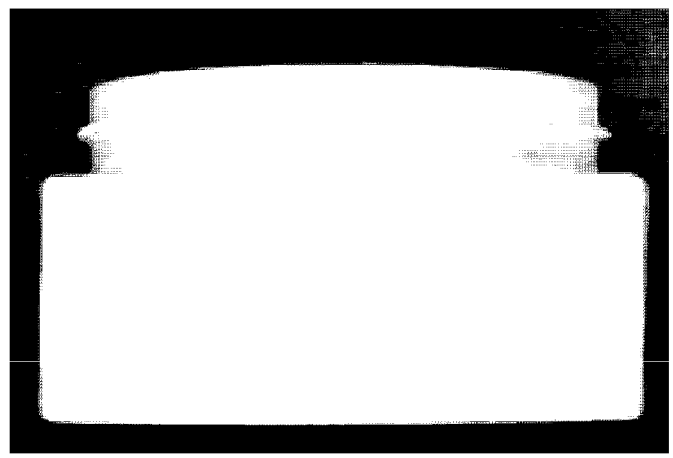
FIGS. 3a and 3b are photographs illustrating an example of a shape of the white glass container that is manufactured by the one-press method.
Figure 3B:
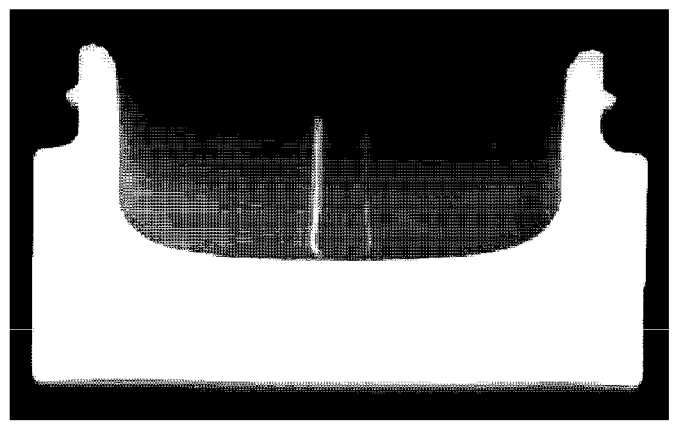

Finally, after gradual cooling, the white glass container including a cylindrical neck portion and a rectangular body portion as shown in external shape photographs of FIGS. 3a and 3b was taken out.

2. Evaluation of White Glass Container (1) Degree of Formation of Multi-Layer Structure in Body Portion (Evaluation 1)

A body portion of the white glass container that was obtained was cut in a vertical direction by using a diamond cutter, and a degree of formation of the multi-layer structure (three-layer structure) in the body portion was determined from an optical photograph (magnification: one time) of a cross-section thereof on the basis of the following criteria.

Very good: Multi-layer structure (three-layer structure) was clearly formed.

Good: Multi-layer structure (three-layer structure) was approximately clearly formed.

Fair: Multi-layer structure (three-layer structure) was not formed partially.

Bad: Multi-layer structure (three-layer structure) was not formed at all.

(2) Degree of Formation of Multi-Layer Structure in Neck Portion (Evaluation 2)

A neck portion of the white glass container that was obtained was cut in a vertical direction by using a diamond cutter, and the degree of formation of the multi-layer structure (three-layer structure) in the neck portion was determined from an optical photograph (magnification: one time) of a cross-section thereof on the basis of the following criteria.

Good: Multi-layer structure (three-layer structure) was not formed.

Fair: Multi-layer structure (three-layer structure) was partially formed.

Bad: Multi-layer structure (three-layer structure) was formed.

(3) Whiteness of Body Portion (Evaluation 3)

A part of the body portion of the white glass container that was obtained was cut using a diamond cutter, and whiteness (L) thereof was measured using a spectral colorimeter (type number: SP62, manufactured by X-Rite Inc.) on the basis of JIS Z 8730, and whiteness was evaluated from a value of the whiteness, which was obtained, on the following criteria.

Very good: Whiteness (L) was 80 or more.
Good: Whiteness (L) was 70 or more.
Fair: Whiteness (L) was 50 or more.
Bad: Whiteness (L) was below 50.

(4) Whiteness of Neck Portion (Evaluation 4)

A part of the neck portion of the white glass container that was obtained was cut by using a diamond cutter, and whiteness (L) thereof was measured using the above-described spectral colorimeter on the basis of JIS Z 8730, and the whiteness of the neck portion was evaluated from a value of the whiteness that was obtained on the following criteria.

In addition, the neck portion is typically provided with a screw portion and is demanded to have predetermined mechanical strength or predetermined mechanical dimensions. Accordingly, it is considered as follows. Even though the whiteness decreases to a certain degree, it is preferable to have a relatively low degree of phase separation in practical use. Accordingly, when the value of the whiteness (L) is equal to or more than a certain value, the whiteness is sufficient as a screw portion, and it is possible to obtain satisfactory balance with the relatively high mechanical strength.

Very good: Whiteness (L) was 40 or more.
Good: Whiteness (L) was 30 or more.
Fair: Whiteness (L) was 20 or more.
Bad: Whiteness (L) was below 20.

(5) Thickness (Evaluation 5)

A part of the body portion of the white glass container that was obtained was cut using a diamond cutter. Then, in the multi-layer structure that constituted the body portion, the thickness (in Table 1, Thickness 1) of the white transparent layer located on an outer side, the thickness (in Table 1, Thickness 2) of the white opaque layer located on an intermediate side, and the thickness (in Table 1, Thickness 3) of the white transparent layer located on an inner side were measured, respectively.

(6) Appearance Property (Evaluation 6)

An external shape or a surface state of the white glass container that was obtained was observed with a naked eye, and the appearance property was evaluated on the basis of the following criteria.

Very good: External shape was not particularly problematic, and a wrinkle was not found on a surface.

Good: External shape was not particularly problematic, and the wrinkle was hardly found on the surface.

Fair: External shape was not particularly problematic, but the wrinkle was found on the surface.

Bad: External shape partially collapsed, and a large wrinkle was found on the surface.

(7) Mechanical Strength (Evaluation 7)

A plurality of the white glass containers (10 pieces) that were obtained were naturally dropped on a plastic tile-adhered concrete surface from a height of 1 m, and a fracture situation was observed to evaluate the mechanical strength on the following criteria.

Very good: The number of damaged pieces was 0.
Good: The number of damaged pieces was 1 or less.
Fair: The number of damaged pieces was 3 or less.
Bad: The number of damaged pieces was 4 or more.

(8) Thermal Shock Properties (Evaluation 8)

A plurality of the white glass containers (10 pieces) that were obtained were immersed in a high-temperature water tank kept at 67° C., and was left as is for 30 minutes. Then, the white glass containers were taken out from the high-temperature water tank, and were immersed in a low-temperature water tank kept at 25° C. and were left as is for 15 minutes.

Then, the white glass containers were taken out from the low-temperature water tank, and appearance was observed to evaluate the thermal shock properties on the basis of the following criteria.

Very good: The number of the white glass containers in which fracturing or cracking occurred was 0.
Good: The number of the white glass containers in which fracturing or cracking occurred was 1 or less.
Fair: The number of the white glass containers in which fracturing or cracking occurred was 3 or less.
Bad: The number of the white glass containers in which fracturing or cracking occurred was 4 or more.

Example 2

In Example 2, a white glass container was prepared by the one-press method in the same manner as Example 1 except that the glass raw materials were combined to obtain the following glass blending composition (in Table 1, described as Blending Composition 2), and an addition effect of BaO, $SO_3$, and $Li_2O$ as a glass component, an addition effect of $CeO_2$ as an oxidizing agent, an addition effect of $Er_2O_3$ as a decoloring agent, and the like were additionally examined.

In addition, in Example 2, a concentration of Fe that was contained in the white glass container was adjusted to be relatively lower (approximately 180 ppm) by using various low-iron glass raw materials.

$SiO_2$: 51% by weight
$P_2O_5$: 7% by weight
$Al_2O_3$: 6% by weight
$B_2O_3$: 8% by weight
$Na_2O$: 11% by weight
$K_2O$: 3% by weight
ZnO: 4% by weight
CaO: 6% by weight
BaO: 2% by weight
$SO_3$: 1% by weight
$Li_2O$: 1% by weight
$CeO_2$: 0.95% by weight
$Er_2O_3$: 0.05% by weight Example 3

In Example 3, a white glass container was prepared by the one-press method in the same manner as Example 1 except that the glass raw materials were combined to obtain the following glass blending composition (in Table 1, described as Blending Composition 3), and an addition effect of BaO, $SO_3$, and $Li_2O$ as a glass component, an effect of a blending amount of $CeO_2$ as an oxidizing agent, an effect of a blending amount of $Er_2O_3$ as a decoloring agent, and the like were additionally examined. Then, the degree of phase separation and the like were evaluated.

In addition, in Example 3, the concentration of Fe that was contained in the white glass container was adjusted to be relatively lower (approximately 180 ppm) by using various low-iron glass raw materials.

$SiO_2$: 50% by weight
$P_2O_5$: 6% by weight
$Al_2O_3$: 6% by weight
$B_2O_3$: 9% by weight
$Na_2O$: 9% by weight
$K_2O$: 3% by weight
ZnO: 6% by weight
CaO: 6% by weight
BaO: 3% by weight
$SO_3$: 1% by weight
$Li_2O$: 1% by weight
$CeO_2$: 0.97% by weight
$Er_2O_3$: 0.03% by weight Example 4

In Example 4, a white glass container was prepared by the one-press method in the same manner as Example 1 except that the glass raw materials were combined to obtain the following glass blending composition (in Table 1, described as Blending Composition 4), and an addition effect of BaO or $SO_3$, an effect of a blending amount on the concentration of Fe, and the like were additionally examined. Then, evaluation was performed.

That is, in Example 4, the concentration of Fe that was contained in the white glass container was adjusted to be relatively higher (approximately 470 ppm) by using various glass raw materials containing a predetermined amount of iron.

$SiO_2$: 51% by weight
$P_2O_5$: 6% by weight
$Al_2O_3$: 6% by weight
$B_2O_3$: 10% by weight
$Na_2O$: 10% by weight
$K_2O$: 3% by weight
ZnO: 5% by weight
CaO: 6% by weight
BaO: 2% by weight
$SO_3$: 1% by weight Comparative Example 1

In Comparative Example 1, a white glass container was prepared by the one-press method in the same manner as Example 1 except that the glass raw materials were combined to obtain the following glass blending composition (in Table 1, described as Blending Composition 5), and an effect of a blending amount of $SiO_2$, $P_2O_5$, and the like were additionally examined. Then, evaluation was performed.

$SiO_2$: 59% by weight
$P_2O_5$: 3% by weight
$Al_2O_3$: 4% by weight
$B_2O_3$: 4% by weight
$Na_2O$: 14% by weight
$K_2O$: 8% by weight
ZnO: 2% by weight
CaO: 2% by weight
BaO: 4% by weight

Comparative Example 2

In Comparative Example 2, a white glass container was prepared by the one-press method in the same manner as Example 1 except that the glass raw materials were combined to obtain the following glass blending composition (in Table 1, described as Blending Composition 6), and an effect of a blending amount of $SiO_2$, $P_2O_5$, and the like, an effect of a blending amount of BaO, $SO_3$, and $Li_2O$ as a glass component, and the like were additionally examined. Then, evaluation was performed.

$SiO_2$: 43% by weight
$P_2O_5$: 10% by weight
$Al_2O_3$: 10% by weight
$B_2O_3$: 14% by weight
$Na_2O$: 13% by weight
$K_2O$: 8% by weight
ZnO: 2% by weight
CaO: 2% by weight
BaO: 4% by weight
$SO_3$: 3% by weight
$Li_2O$: 5% by weight

Comparative Example 3

In comparative example 3, a white glass container was prepared by the one-press method in the same manner as Example 1 except that the glass raw materials were combined to obtain the following glass blending composition (in Table 1, described as Blending Composition 7), and an effect of a blending amount of BaO and $SO_3$ as a glass component, an effect of a blending amount of $CeO_2$ as an oxidizing agent, an effect of a blending amount of $Er_2O_3$ as a decoloring agent, and the like were additionally examined. Then, evaluation was performed.

$SiO_2$: 48% by weight
$P_2O_5$: 10% by weight
$Al_2O_3$: 10% by weight
$B_2O_3$: 13% by weight
$Na_2O$: 13% by weight
$K_2O$: 0.5% by weight
ZnO: 0.44% by weight
CaO: 0.5% by weight
BaO: 1% by weight
$SO_3$: 3% by weight
$CeO_2$: 0.05% by weight
$Er_2O_3$: 0.01% by weight

TABLE 1

|  | Example 1 | Example 2 | Example 3 | Example 4 | Comparative Example 1 | Comparative Example 2 | Comparative Example 3 |
|---|---|---|---|---|---|---|---|
| Glass Composition | 1 | 2 | 3 | 4 | 5 | 6 | 7 |
| Evaluation 1 | Very good | Good | Very good | Very good | Fair | Fair | Good |
| Evaluation 2 | Good | Good | Good | Good | Bad | Good | Good |
| Evaluation 3 | Very good | Very good | Very good | Very good | Fair | Good | Good |
| Evaluation 4 | Very good | Very good | Very good | Very good | Bad | Very good | Very good |
| Evaluation 5 |  |  |  |  |  |  |  |
| Thickness 1 | 1.0 | 1.5 | 1.0 | 1.0 | 3.0 | 3.0 | 1.5 |
| Thickness 2 | 6.5 | 6.0 | 6.5 | 6.5 | 3.5 | 3.5 | 6.0 |
| Thickness 3 | 0.5 | 0.5 | 0.5 | 0.5 | 1.5 | 1.5 | 0.5 |
| Evaluation 6 | Good | Very good | Very good | Very good | Good | Good | Good |
| Evaluation 7 | Good | Very good | Very good | Good | Very good | Bad | Fair |
| Evaluation 8 | Good | Very good | Very good | Good | Very good | Bad | Fair |

Evaluation 1: Degree of formation of the multi-layer structure in the body portion
Evaluation 2: Degree of formation of the multi-layer structure in the neck portion
Evaluation 3: Whiteness of the body portion
Evaluation 4: Whiteness of the neck portion
Evaluation 5: Thickness (unit: mm)
Evaluation 6: Appearance property
Evaluation 7: Mechanical strength
Evaluation 8: Thermal shock property

Examples 5 to 8

In Examples 5 to 8, white glass containers including a cylindrical neck portion and a cylindrical body portion as shown in FIGS. 4a and 4b were prepared by a blow method (blow and blow method) by using the glass compositions (Glass Compositions 1 to 4) described in Examples 1 to 4, respectively, and Evaluation 1' to Evaluation 8' were performed in the same manner as Example 1 described above, and the like.

That is, with regard to Evaluation 1', a body portion of each of the white glass containers that were obtained was cut in a vertical direction by using a diamond cutter, and the degree of formation of the multi-layer structure (two-layer structure) in the body portion was determined from an optical photograph (magnification: one time) of a cross-section thereof on the basis of the following criteria.

Very good: Multi-layer structure (two-layer structure) was clearly formed.

Good: Multi-layer structure (two-layer structure) was approximately clearly formed.

Fair: Multi-layer structure (two-layer structure) was not formed partially.

Bad: Multi-layer structure (two-layer structure) was not formed at all.

In addition, with regard to Evaluation 2', the neck portion of each of the white glass containers that were obtained was cut in a vertical direction by using a diamond cutter, and the degree of formation of the multi-layer structure (two-layer structure) in the neck portion was determined from an optical photograph (magnification: one time) of a cross-section thereof on the basis of the following criteria.

Good: Multi-layer structure (two-layer structure) was not formed.

Fair: Multi-layer structure (two-layer structure) was partially formed.

Bad: Multi-layer structure (two-layer structure) was formed.

In addition, with regard to Evaluation 4', Evaluation 6', and Evaluation 7', the same evaluations as Evaluation 4 (the whiteness of the neck portion), Evaluation 6 (the appearance property), and Evaluation 7 (the mechanical strength) in Example 1 and the like were performed to evaluate the white glass container that were obtained.

In addition, with regard to Evaluation 5', each of the white glass containers that were obtained was cut using a diamond cutter, and in the multi-layer structure that constituted the side wall, the thickness (in table 2, Thickness 1) of the white transparent layer located on an outer side and the thickness (in table 2, Thickness 2) of the white opaque layer located on an inner side were measured from an optical photograph (magnification: 10 times) of a cross-section thereof, respectively.

Furthermore, with regard to Evaluation 8', an inner pressure resistance test was performed with respect to the white glass containers that were obtained. That is, the inner pressure resistance of the white glass containers (five pieces) that were obtained was measured according to JIS S-2302 to calculate an average value, and evaluation was performed on the basis of the following criteria.

Very good: Value equal to or higher than 3000 MPa
Good: Value equal to or higher than 2000 MPa
Fair: Value equal to or higher than 1000 MPa
Bad: Value below 1000 MPa Comparative Examples 4 to 6

In Comparative Examples 4 to 6, white glass containers were prepared by a blow method (blow and blow method) by using the glass compositions (Glass Compositions 5 to 7) described in Comparative Examples 1 to 3, respectively, and evaluation was performed in the same manner as Example 5.

three-layer structure) which is derived from the phase separation phenomenon of the glass composition having a predetermined blending composition, and which includes the white transparent layer having relatively low whiteness and the white opaque layer having relatively high whiteness in part or the whole of the white glass container. Accordingly, it is possible to obtain a white glass container which does not contain a significant amount of fluorine compound, which has the multi-layer structure in part or the whole of the white glass container without depending on melting conditions or molding conditions of the glass composition, and which is excellent in mechanical strength or whiteness.

In addition, according to the method of manufacturing the white glass container of the invention, the white glass container has the multi-layer structure (for example, two-layer structure or three-layer structure) which is derived from the phase separation phenomenon of the glass composition having a predetermined blending composition, and which includes the white transparent layer having relatively low whiteness and the white opaque layer having relatively high whiteness in part or the whole of the white glass container. Accordingly, it is possible to efficiently obtain a white glass container which does not contain a significant amount of fluorine compound, which has the multi-layer structure in part or the whole of the white glass container without depending on melting conditions or molding conditions of the glass composition, and which is excellent in mechanical strength or whiteness.

Accordingly, according to the white glass container of the invention, it is possible to efficiently obtain a white glass container which is white from the body portion and the like to the neck portion (bottle mouth), and which is excellent in mechanical strength. The white glass container is excellent in the high-grade sensation and the texture, and thus an additional decorating treatment is not necessary. As a result, the white glass container is expected to be used for a glass container for high-grade cosmetics, and the like.

TABLE 2

|  | Example 5 | Example 6 | Example 7 | Example 8 | Comparative Example 4 | Comparative Example 5 | Comparative Example 6 |
|---|---|---|---|---|---|---|---|
| Glass composition | 1 | 2 | 3 | 4 | 5 | 6 | 7 |
| Evaluation 1 | Very good | Very good | Very good | Very good | Fair | Fair | Good |
| Evaluation 2 | Good | Good | Good | Good | Bad | Good | Good |
| Evaluation 3 | Very good | Very good | Very good | Very good | Fair | Good | Good |
| Evaluation 4 | Very good | Very good | Very good | Very good | Bad | Very good | Very good |
| Evaluation 5 |  |  |  |  |  |  |  |
| Thickness 1 | 1.0 | 1.0 | 1.0 | 1.0 | 2.5 | 2.5 | 1.0 |
| Thickness 2 | 4.0 | 4.0 | 4.0 | 4.0 | 1.5 | 1.5 | 4.0 |
| Evaluation 6 | Good | Very good | Very good | Very good | Good | Good | Good |
| Evaluation 7 | Good | Very good | Very good | Good | Very good | Bad | Fair |
| Evaluation 8 | Good | Very good | Very good | Good | Very good | Bad | Fair |

Evaluation 1: Degree of formation of the multi-layer structure in the body portion
Evaluation 2: Degree of formation of the multi-layer structure in the neck portion
Evaluation 3: Whiteness of the body portion
Evaluation 4: Whiteness of the neck portion
Evaluation 5: Thickness (unit: mm)
Evaluation 6: Appearance property
Evaluation 7: Mechanical strength
Evaluation 8: Inner pressure resistance test

INDUSTRIAL APPLICABILITY

As described above, according to the white glass container of the invention, the white glass container has the multi-layer structure (for example, two-layer structure or

EXPLANATIONS OF LETTERS OR NUMERALS 10, 10', 30, 30': White glass container
12, 12': White transparent layer (second white transparent layer)

14, 14': White opaque layer
16, 16': White transparent layer (first white transparent layer)
18, 18': Body portion
20, 20': Neck portion (screw portion)
32, 32': White opaque layer
34, 34': White transparent layer
36, 36': Body portion (side wall and bottom)
38, 38': Neck portion (screw portion)
51: Molding mold
52: funnel
53: Glass gob
54: Baffle
55: Plunger
60, 121: Rotary device
62, 123: Arm
64: Mouth mold
66, 66a, 66b: Cooling mold
70: Blow head
100: Glass gob
101: Parison
112: Plunger
113: Funnel
125: Mouth mold
127: Air blowing port for final blow
210: Flame polishing treatment apparatus

The invention claimed is:

1. A white glass container which is derived from a phase separation phenomenon of a glass composition having the following glass blending composition on the basis of the total amount and which has a multi-layer structure including a white transparent layer having relatively low whiteness and a white opaque layer having relatively high whiteness in part or the whole of the white glass container,
   $SiO_2$: 45% by weight to 58% by weight,
   $P_2O_5$: 2% by weight to 8% by weight,
   $Al_2O_3$: 5% by weight to 9% by weight,
   $B_2O_3$: 5% by weight to 13% by weight,
   $Na_2O$: 5% by weight to 12% by weight,
   $K_2O$: 1% by weight to 6% by weight,
   $ZnO$: 3% by weight to 10% by weight, and
   $CaO$: 3% by weight to 10% by weight.

2. The white glass container according to claim 1,
   wherein the glass composition further contains at least one metal oxide selected from a group consisting of $BaO$, $Li_2O$, and $SO_3$, and a blending amount of at least one of the metal oxide among $BaO$, $Li_2O$, and $SO_3$ is set to a value within the range of 0.1% by weight to 5% by weight on the basis of the total amount.

3. The white glass container according to claim 1,
   wherein the glass composition contains $CeO_2$ as an oxidizing agent, and a blending amount of $CeO_2$ is set to a value within the range of 0.1% by weight to 2% by weight on the basis of the total amount.

4. The white glass container according to claim 1,
   wherein the glass composition further contains $Er_2O_3$, and a blending amount of $Er_2O_3$ is set to a value within the range of 0.01% by weight to 0.5% by weight on the basis of the total amount.

5. The white glass container according to claim 1,
   wherein the thickness of the white transparent layer is set to a value within the range of 0.1 mm to 10 mm, and the thickness of the white opaque layer is set to a value within the range of 3 mm to 25 mm.

6. A method of manufacturing a white glass container having a three-layer structure which is derived from a phase separation phenomenon of a glass composition and which includes a white transparent layer having relatively low whiteness, a white opaque layer having relatively high whiteness, and a white transparent layer having relatively low whiteness, the method comprising:
   a first process of preparing a glass composition having the following glass blending composition on the basis of the total amount, and melting the glass composition,
   $SiO_2$: 45% by weight to 58% by weight,
   $P_2O_5$: 2% by weight to 8% by weight,
   $Al_2O_3$: 5% by weight to 9% by weight,
   $B_2O_3$: 5% by weight to 13% by weight,
   $Na_2O$: 5% by weight to 12% by weight,
   $K_2O$: 1% by weight to 6% by weight,
   $ZnO$: 3% by weight to 10% by weight, and
   $CaO$: 3% by weight to 10% by weight; and
   a second process of molding and gradually cooling the glass composition, which is melted, by using a mold and a plunger according to a one-press method to obtain the white glass container having a multi-layer structure derived from the phase separation phenomenon of the glass composition in part or the whole of the white glass container.

7. The method of manufacturing a white glass container according to claim 6,
   wherein in the first process, moisture is blended and a bubbling treatment is performed to melt and stir the glass composition.

8. A method of manufacturing a white glass container having a two-layer structure which is derived from a phase separation phenomenon of a glass composition, and which includes a white transparent layer having relatively low whiteness, and a white opaque layer having relatively high whiteness, the method comprising:
   a first(') process of preparing a glass composition having the following glass blending composition on the basis of the total amount, and melting the glass composition,
   $SiO_2$: 45% by weight to 58% by weight,
   $P_2O_5$: 2% by weight to 8% by weight,
   $Al_2O_3$: 5% by weight to 9% by weight,
   $B_2O_3$: 5% by weight to 13% by weight,
   $Na_2O$: 5% by weight to 12% by weight,
   $K_2O$: 1% by weight to 6% by weight,
   $ZnO$: 3% by weight to 10% by weight, and
   $CaO$: 3% by weight to 10% by weight; and
   a second(') process of molding and gradually cooling the glass composition, which is melted, by using a mold and cooling air according to a blow method to obtain the white glass container having a multi-layer structure derived from the phase separation phenomenon of the glass composition in part or the whole of the white glass container.

9. The method of manufacturing a white glass container according to claim 8,
   wherein in the first(') process, moisture is blended and a bubbling treatment is performed to melt and stir the glass composition.

* * * * *